Dec. 1, 1953   H. L. LAMBERT   2,660,950
TRIP MEANS FOR ROTARY METERED MAILING MACHINES
Filed March 7, 1947   24 Sheets-Sheet 1

INVENTOR
Harry L. Lambert
BY
Blair, Curtis & Hayward
ATTORNEYS

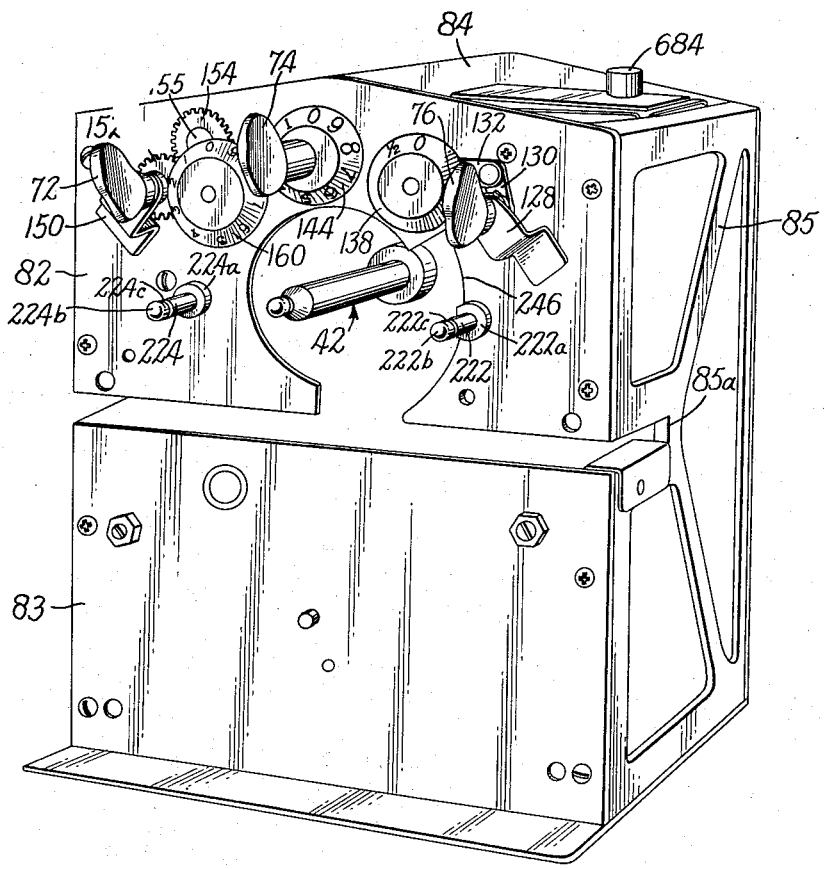

Dec. 1, 1953     H. L. LAMBERT     2,660,950
TRIP MEANS FOR ROTARY METERED MAILING MACHINES
Filed March 7, 1947     24 Sheets-Sheet 3

INVENTOR.
Harry L. Lambert
BY
Blair, Curtis + Hayward
ATTORNEYS

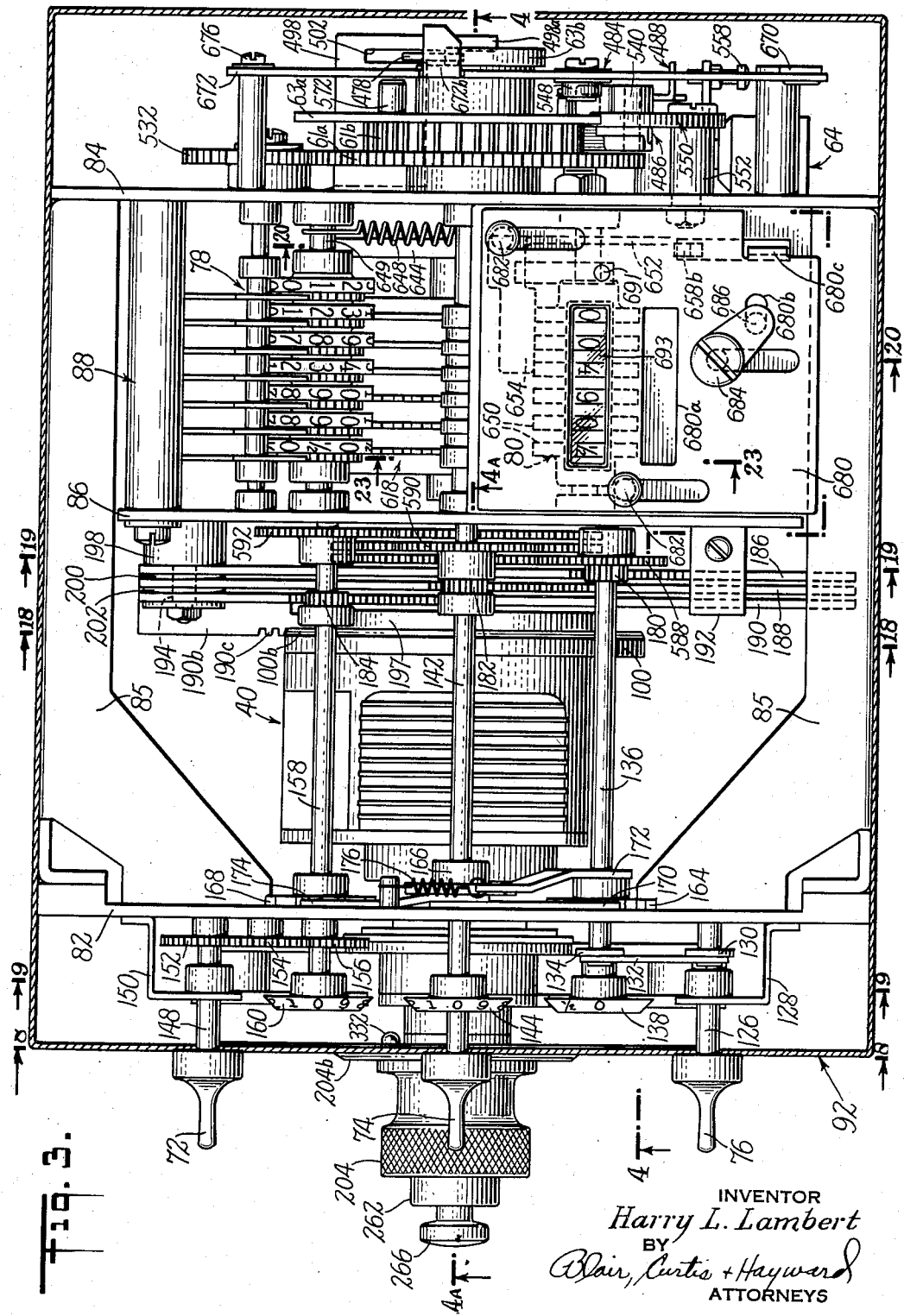

Dec. 1, 1953  H. L. LAMBERT  2,660,950
TRIP MEANS FOR ROTARY METERED MAILING MACHINES
Filed March 7, 1947  24 Sheets-Sheet 5

INVENTOR
*Harry L. Lambert*
BY
*Blair, Curtis & Hayward*
ATTORNEYS

Dec. 1, 1953   H. L. LAMBERT   2,660,950
TRIP MEANS FOR ROTARY METERED MAILING MACHINES
Filed March 7, 1947   24 Sheets-Sheet 6

INVENTOR
Harry L. Lambert
BY
Blair, Curtis & Hayward
ATTORNEYS

Dec. 1, 1953 H. L. LAMBERT 2,660,950
TRIP MEANS FOR ROTARY METERED MAILING MACHINES
Filed March 7, 1947 24 Sheets-Sheet 7
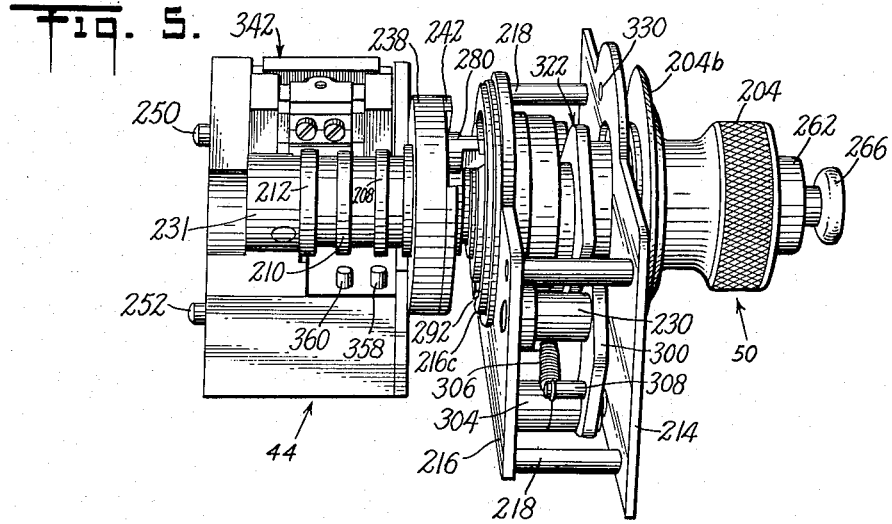
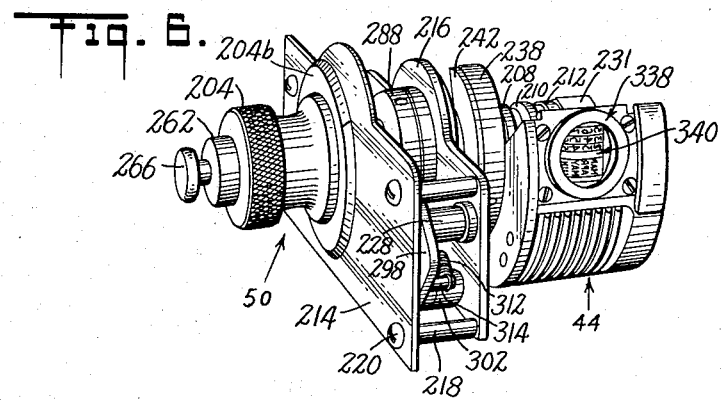
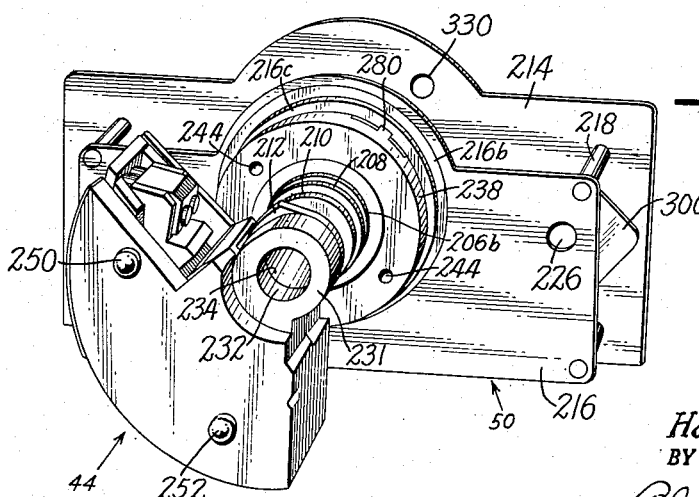
INVENTOR.
Harry L. Lambert
BY
Blair, Curtis + Hayward
ATTORNEYS Dec. 1, 1953  H. L. LAMBERT  2,660,950
TRIP MEANS FOR ROTARY METERED MAILING MACHINES
Filed March 7, 1947  24 Sheets-Sheet 8

INVENTOR
Harry L. Lambert
BY
Blair, Curtis & Hayward
ATTORNEYS

Dec. 1, 1953　　　　　H. L. LAMBERT　　　　2,660,950
TRIP MEANS FOR ROTARY METERED MAILING MACHINES
Filed March 7, 1947　　　　　　　　　　24 Sheets-Sheet 9

INVENTOR.
Harry L. Lambert
BY
Blair, Curtis + Hayward
ATTORNEYS

Dec. 1, 1953 H. L. LAMBERT 2,660,950
TRIP MEANS FOR ROTARY METERED MAILING MACHINES
Filed March 7, 1947 24 Sheets-Sheet 10

INVENTOR
Harry L. Lambert
BY
Blair, Curtis + Hayward
ATTORNEYS

Dec. 1, 1953        H. L. LAMBERT        2,660,950
TRIP MEANS FOR ROTARY METERED MAILING MACHINES
Filed March 7, 1947        24 Sheets-Sheet 11
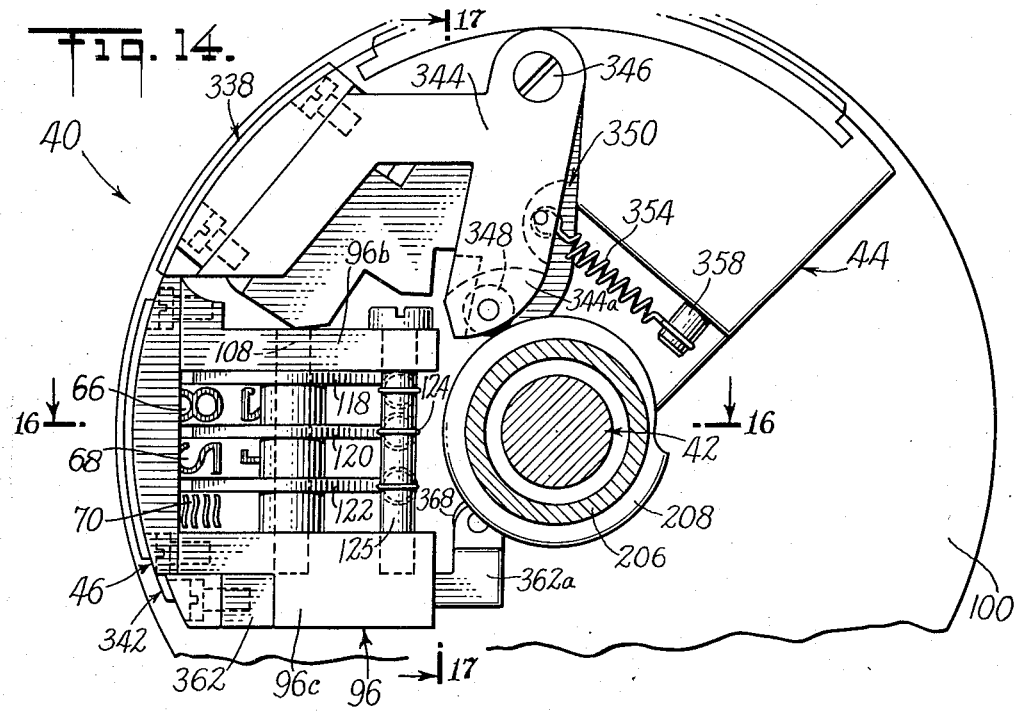
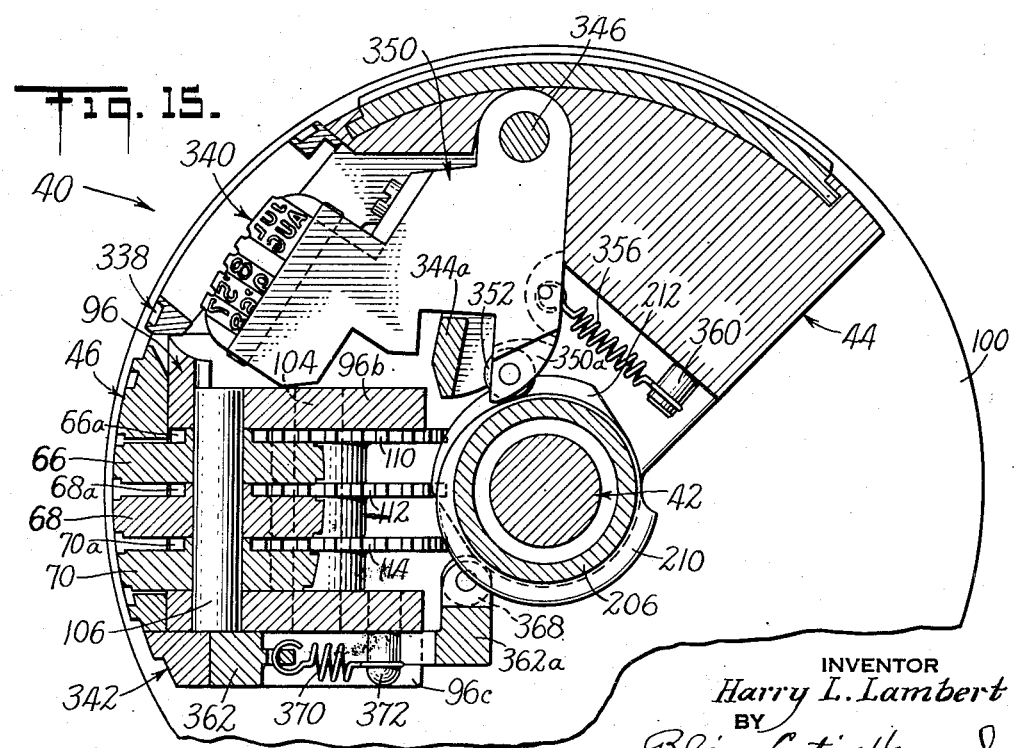
INVENTOR
*Harry L. Lambert*
BY
*Blair, Curtis & Hayward*
ATTORNEYS

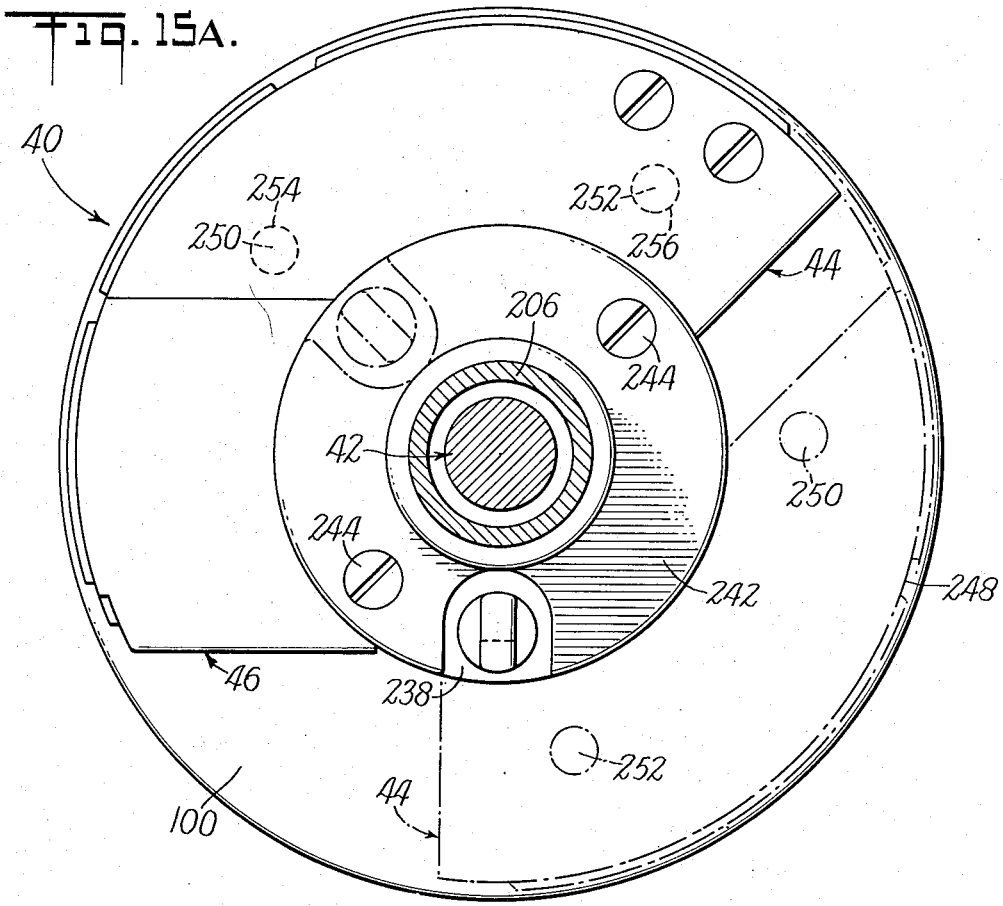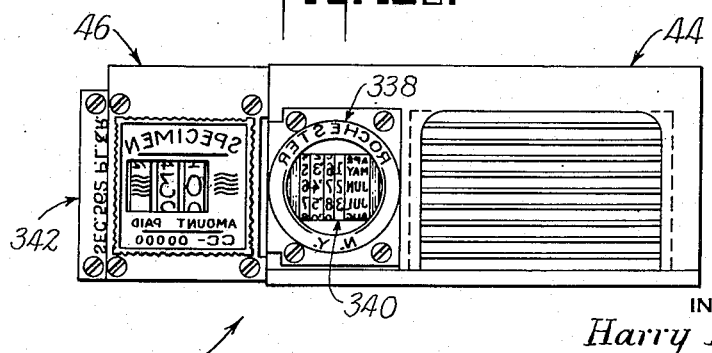

Dec. 1, 1953     H. L. LAMBERT     2,660,950
TRIP MEANS FOR ROTARY METERED MAILING MACHINES
Filed March 7, 1947     24 Sheets-Sheet 13
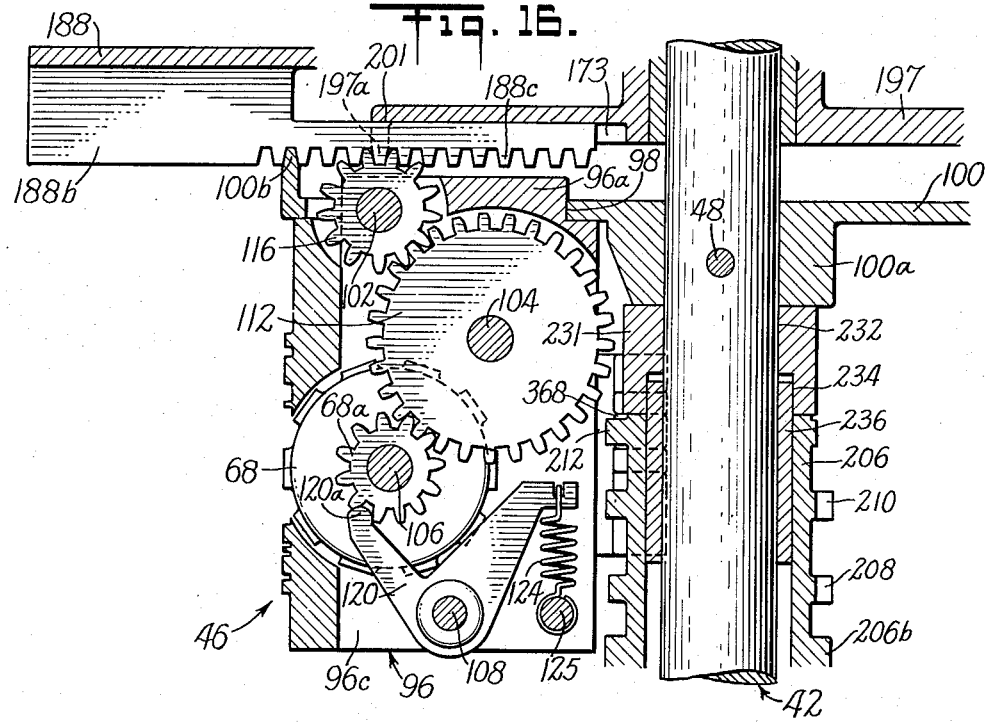
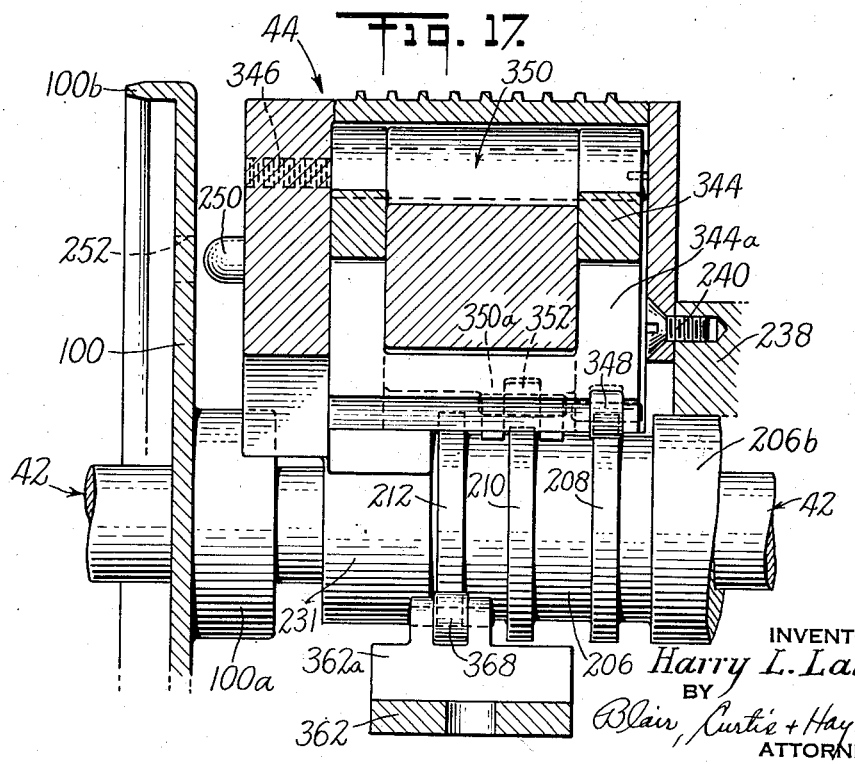
INVENTOR
Harry L. Lambert
BY
Blair, Curtis + Hayward
ATTORNEYS Dec. 1, 1953  H. L. LAMBERT  2,660,950
TRIP MEANS FOR ROTARY METERED MAILING MACHINES
Filed March 7, 1947  24 Sheets—Sheet 14
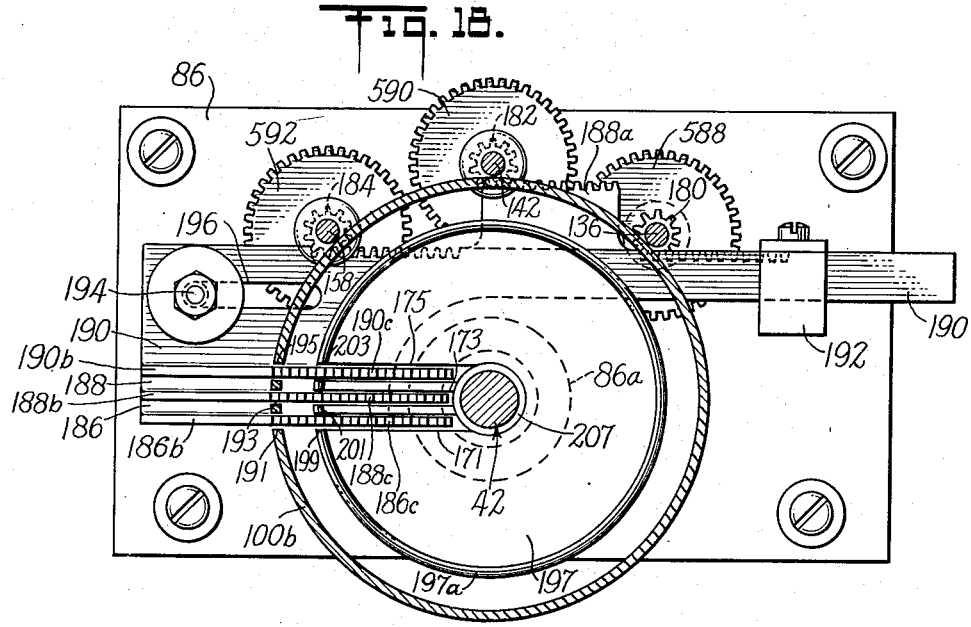
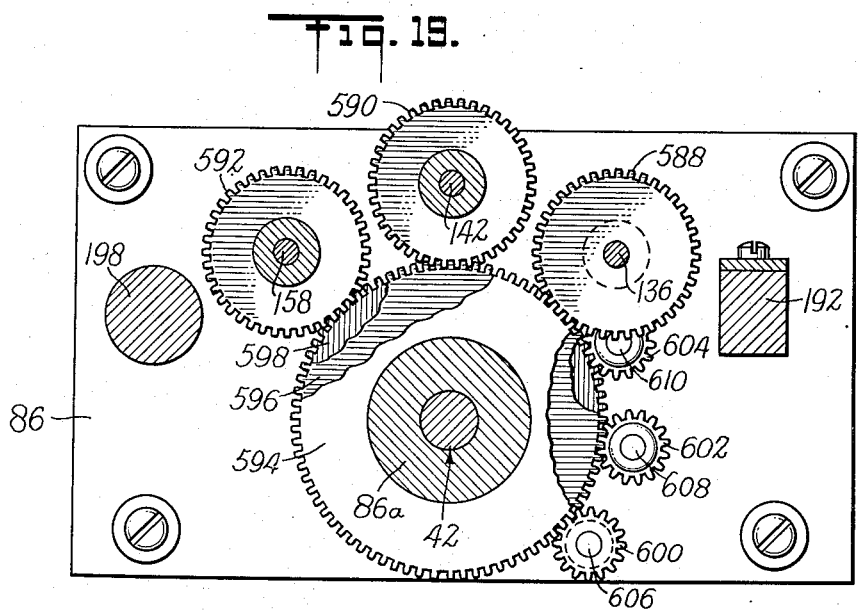
INVENTOR
*Harry L. Lambert*
BY
*Blair, Curtis & Hayward*
ATTORNEYS Dec. 1, 1953    H. L. LAMBERT    2,660,950
TRIP MEANS FOR ROTARY METERED MAILING MACHINES
Filed March 7, 1947    24 Sheets-Sheet 15
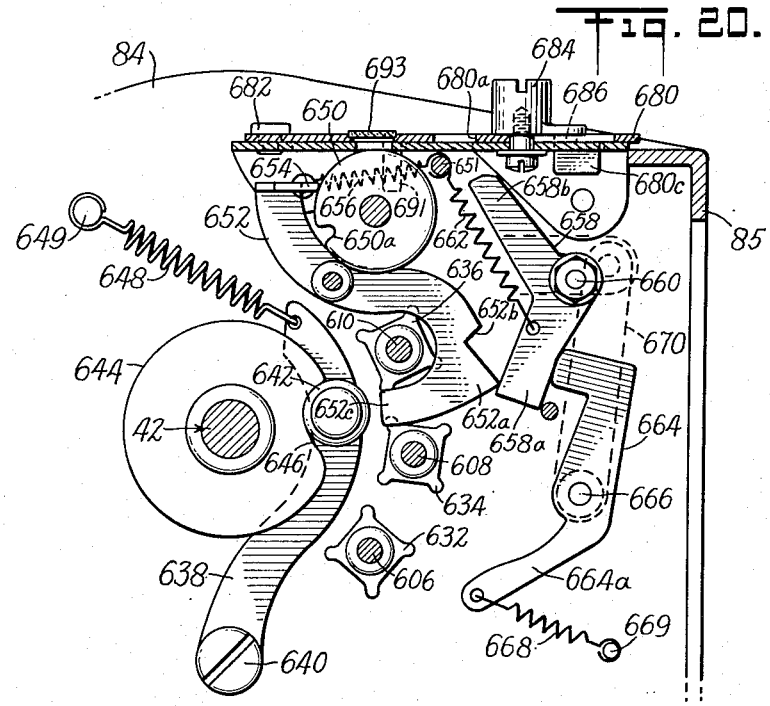
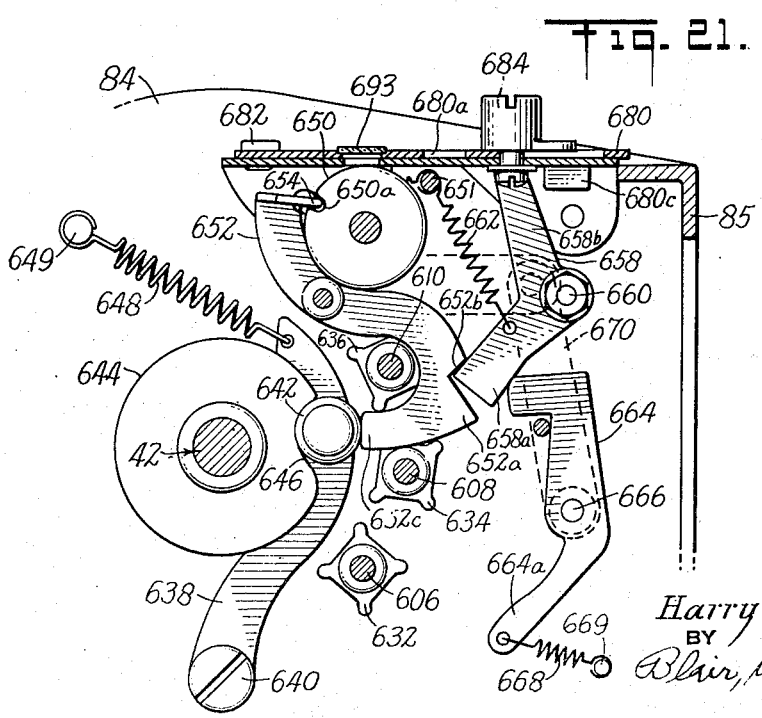
INVENTOR
*Harry L. Lambert*
BY
*Blair, Curtis & Hayward*
ATTORNEYS Dec. 1, 1953 H. L. LAMBERT 2,660,950
TRIP MEANS FOR ROTARY METERED MAILING MACHINES
Filed March 7, 1947 24 Sheets-Sheet 16

INVENTOR
Harry L. Lambert
BY
Blair, Curtis & Hayward
ATTORNEYS

Dec. 1, 1953  H. L. LAMBERT  2,660,950
TRIP MEANS FOR ROTARY METERED MAILING MACHINES
Filed March 7, 1947  24 Sheets-Sheet 17
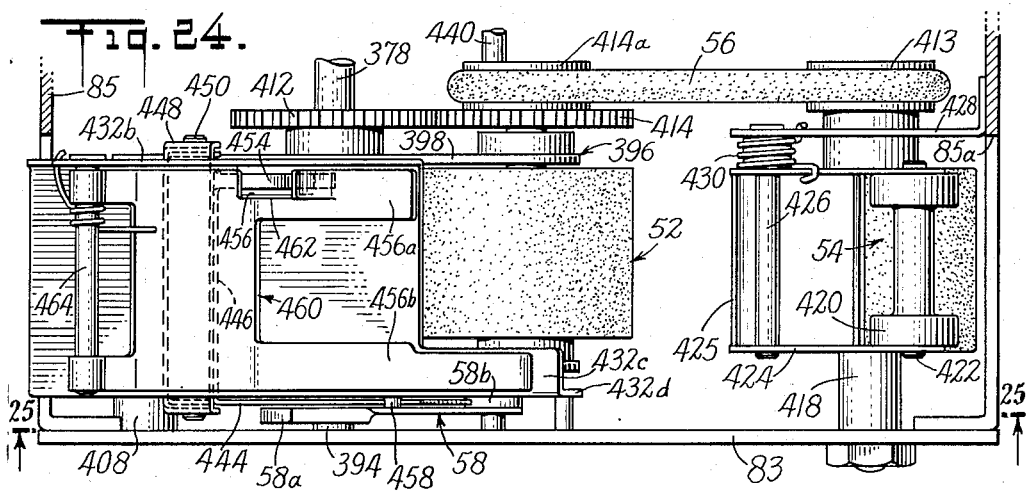
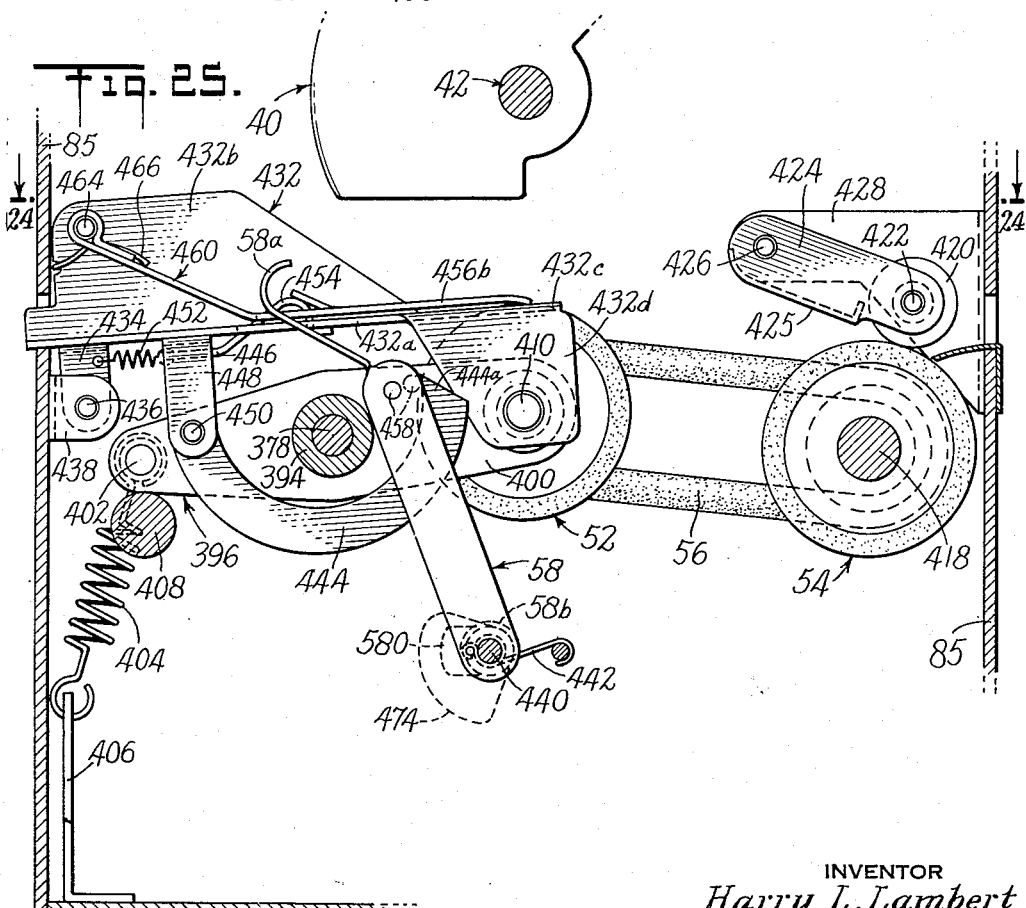
INVENTOR
Harry L. Lambert
BY
Blair, Curtis & Hayward
ATTORNEYS Dec. 1, 1953 H. L. LAMBERT 2,660,950
TRIP MEANS FOR ROTARY METERED MAILING MACHINES
Filed March 7, 1947 24 Sheets-Sheet 18

INVENTOR
Harry L. Lambert
BY
Blair, Curtis & Hayward
ATTORNEYS

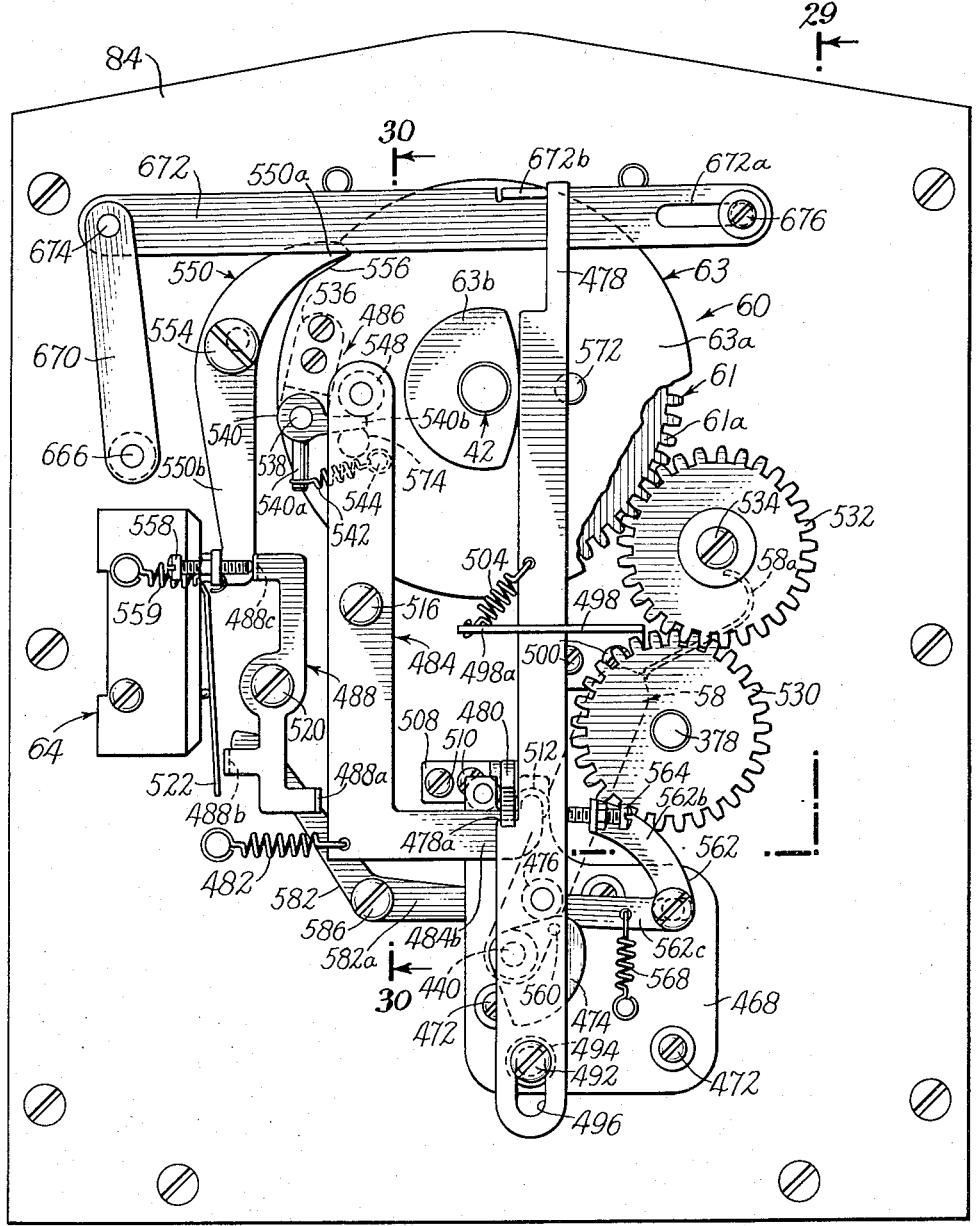

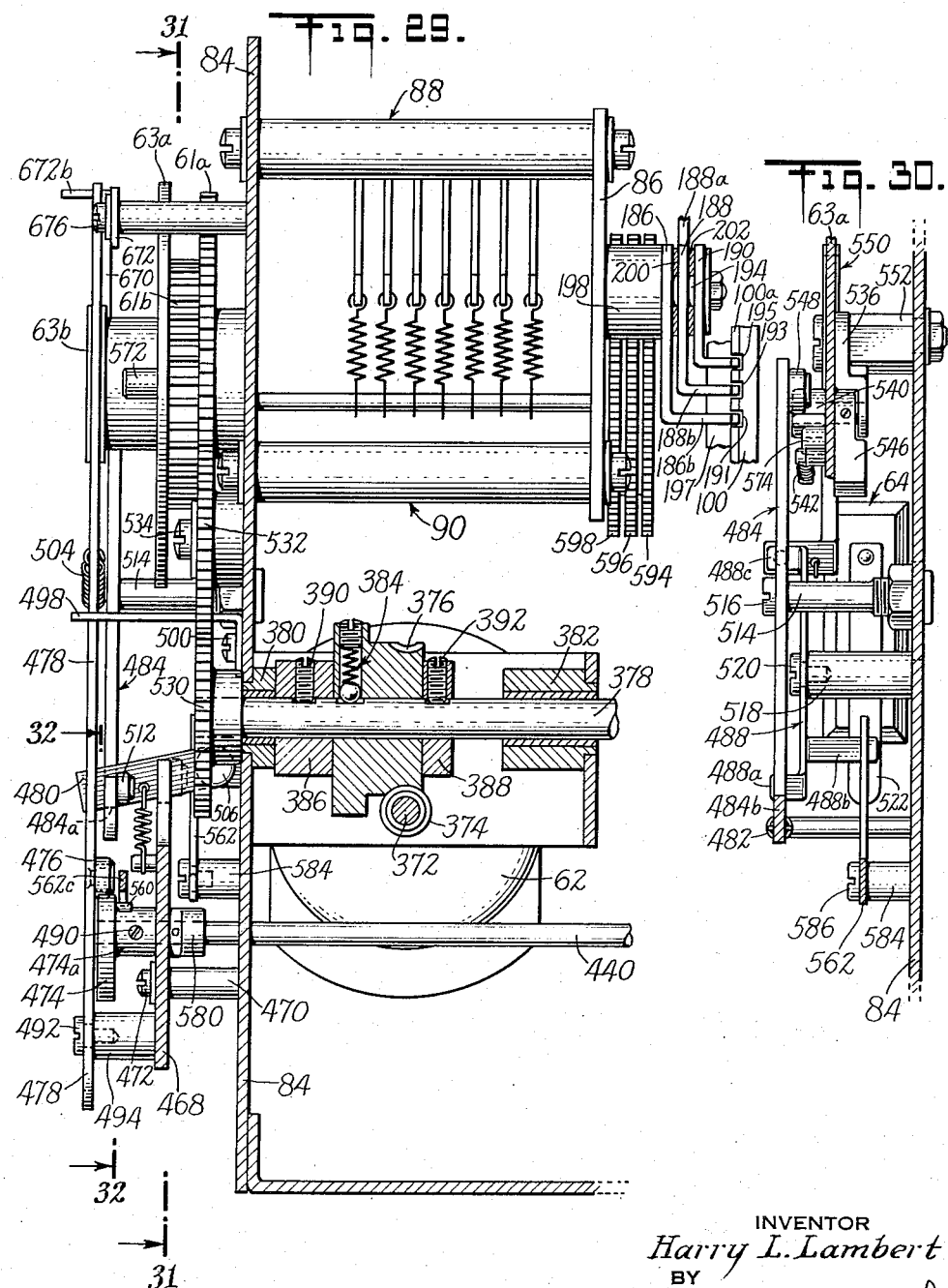

Dec. 1, 1953    H. L. LAMBERT    2,660,950
TRIP MEANS FOR ROTARY METERED MAILING MACHINES
Filed March 7, 1947    24 Sheets-Sheet 21

INVENTOR
Harry L. Lambert
BY
Blair, Curtis + Hayward
ATTORNEYS

Dec. 1, 1953 H. L. LAMBERT 2,660,950
TRIP MEANS FOR ROTARY METERED MAILING MACHINES
Filed March 7, 1947 24 Sheets-Sheet 23

INVENTOR
Harry L. Lambert
BY
Blair, Curtis & Hayward
ATTORNEYS

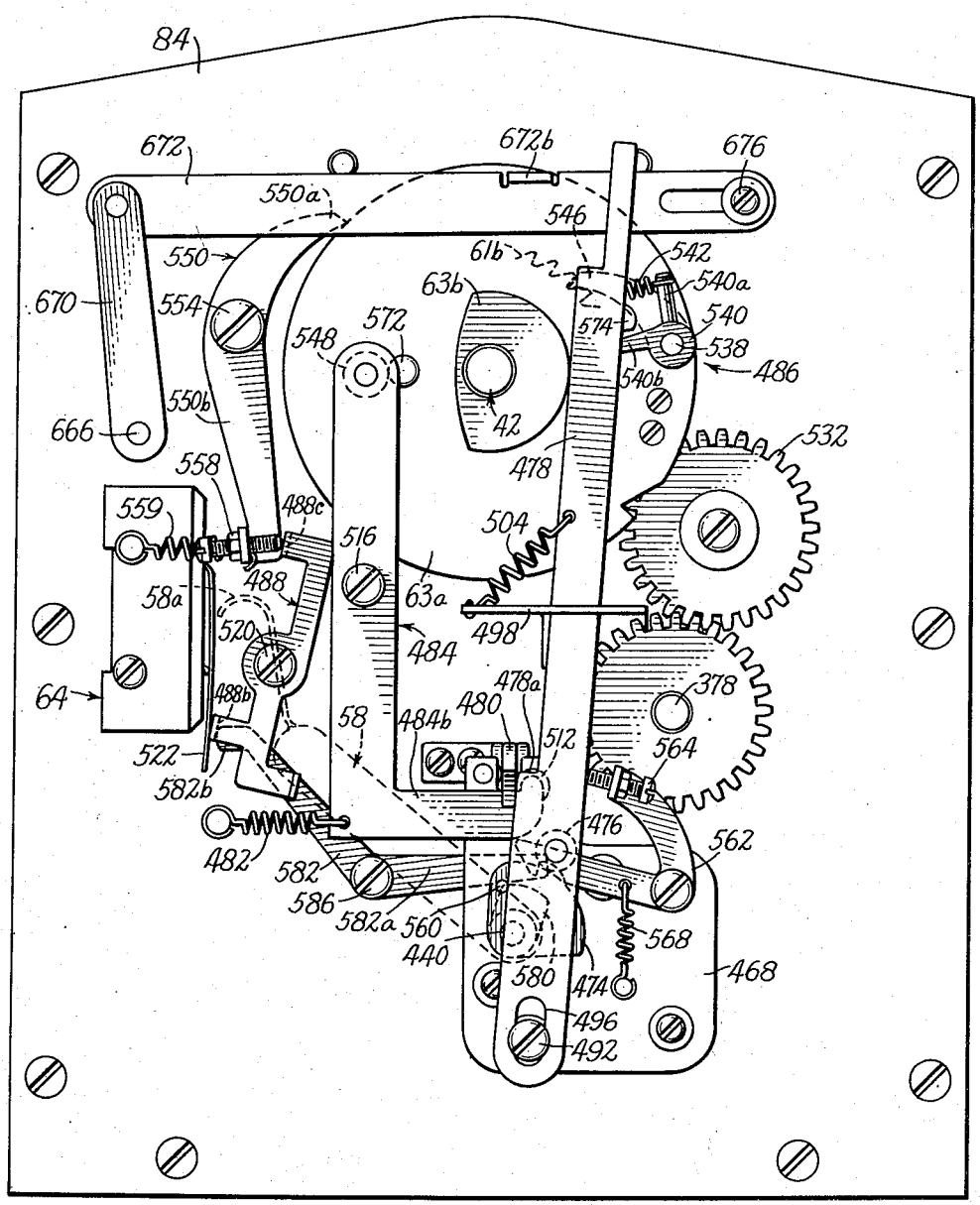

Patented Dec. 1, 1953

2,660,950

UNITED STATES PATENT OFFICE 2,660,950

TRIP MEANS FOR ROTARY METERED MAILING MACHINES

Harry L. Lambert, Rochester, N. Y., assignor to Commercial Controls Corporation, a corporation of Delaware Application March 7, 1947, Serial No. 732,982

14 Claims. (Cl. 101—235)

This invention relates to a metered mailing machine.

One of the objects of this invention is to provide a metered mailing machine which is simple, practical, and thoroughly durable. Another object is to provide an improved machine of the above character. Another object is to provide a machine of the above character which may be manufactured from inexpensive materials without undue labor costs. Another object is to provide a machine of the above character which will be efficient and accurate in operation. Another object is to provide a machine of the above character which will be light in weight and in which the meter and power unit are combined into one unit. Another object is to provide a machine of the above character in which simple and efficient mechanism is provided for setting the date wheel, P. L. & R., and the date circle dies for different types of mail. Other objects will be in part obvious and in part pointed out hereinafter.

The invention accordingly consists in the features of construction, combinations of elements, and arrangements of parts, all as will be illustratively described herein, and the scope of the application of which will be indicated in the following claims.

Referring now to the accompanying drawings, in which is shown one of the various possible embodiments of this invention, Figure 1 is a perspective view of the machine;

Figure 2 is a view similar to Figure 1 with the housing and the detachable section of the printing head removed;

Figure 3 is a top plan view on an enlarged scale of the machine with the top portion of the housing removed;

Figure 2A:
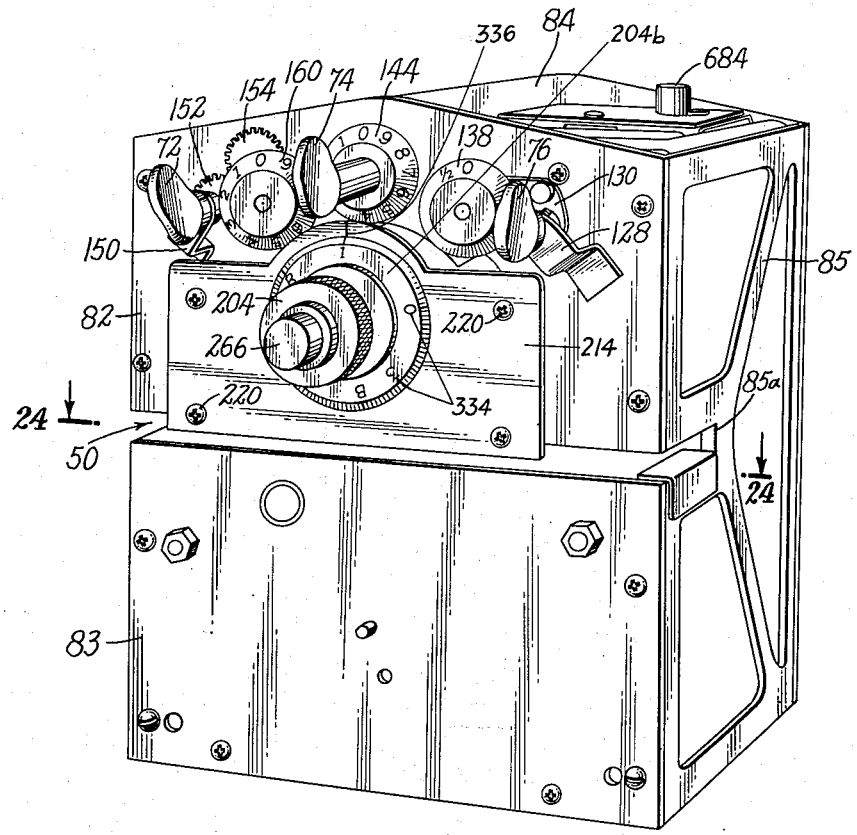
Figure 2a is a view similar to Figure 1 with the housing removed.
Figure 4:
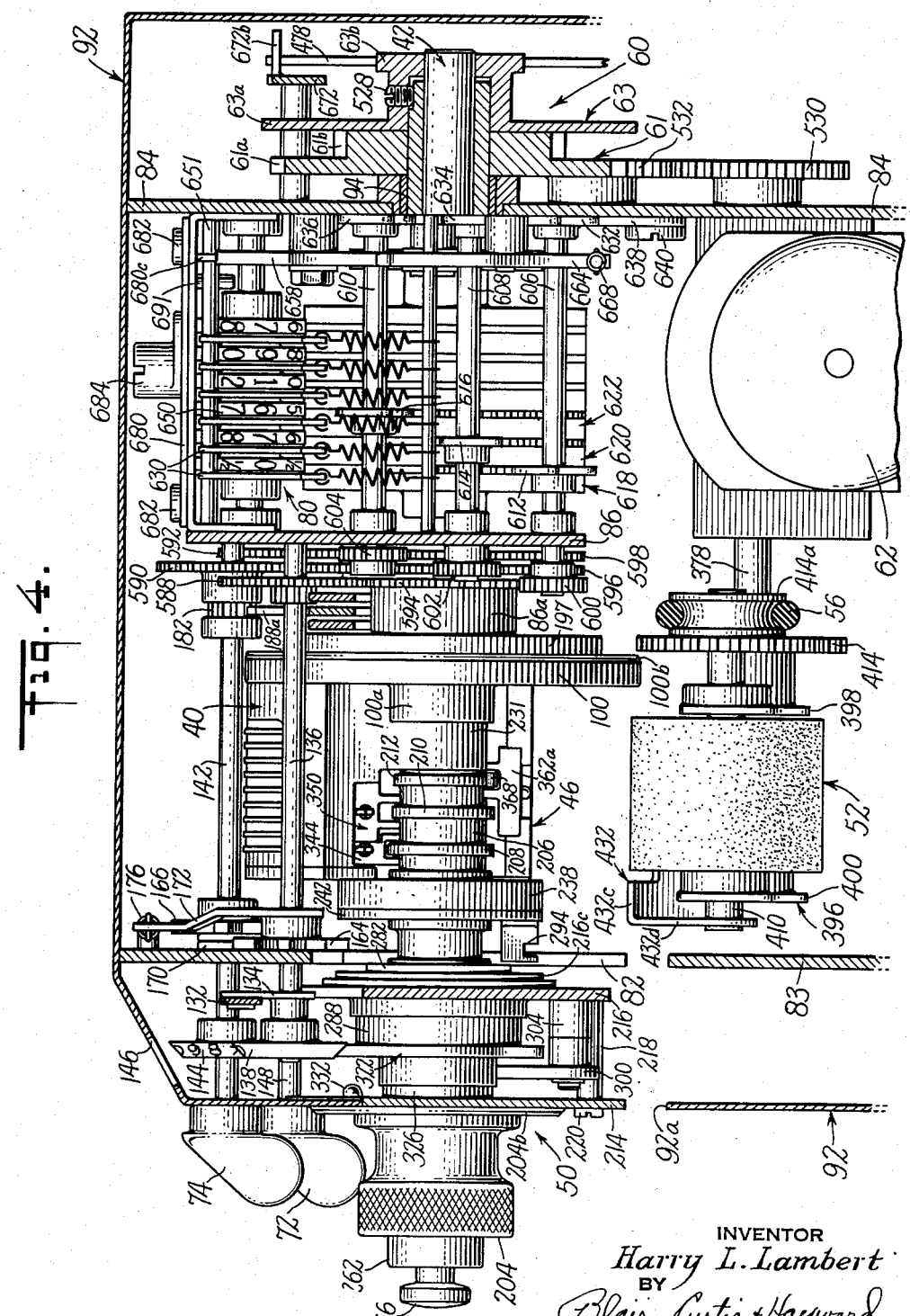
Figure 4 is a vertical section taken on the line 4—4 of Figure 3, certain parts being shown in elevation.
Figure 4A:
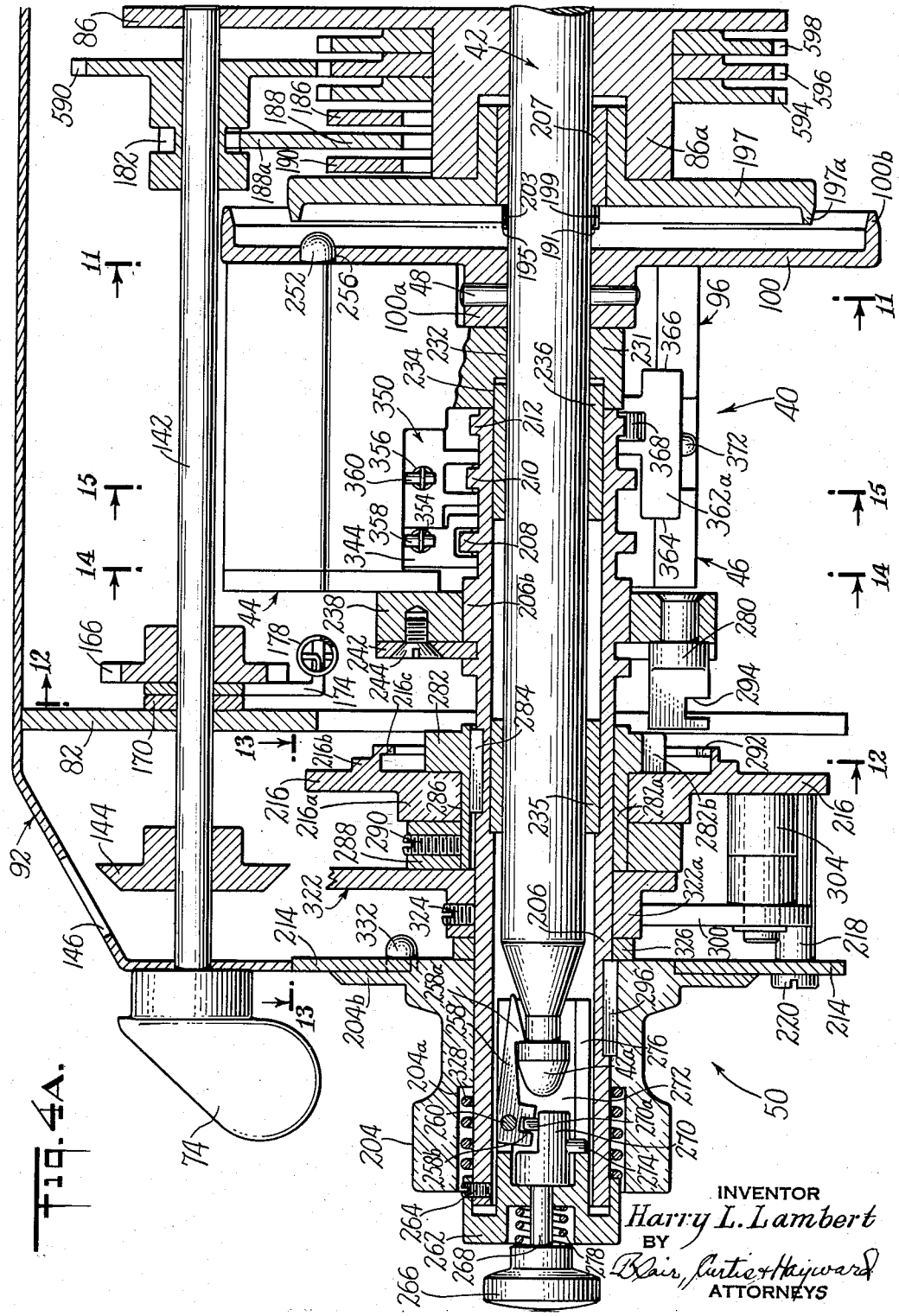
Figure 4a is a vertical section on an enlarged scale taken on the line 4a—4a of Figure 3.
Figure 8:
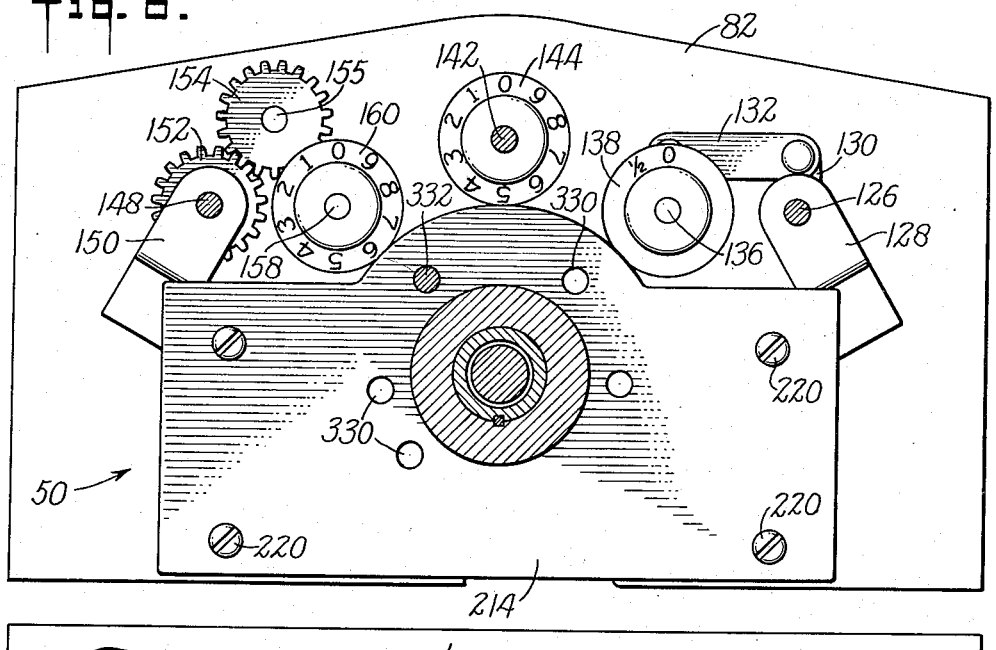
Figure 9:
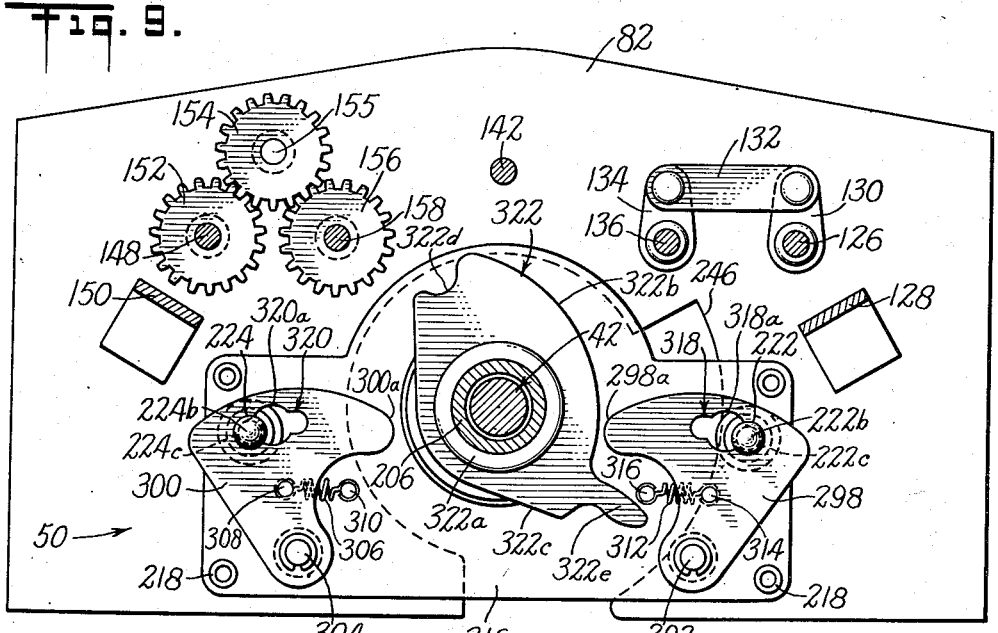
Figure 10:
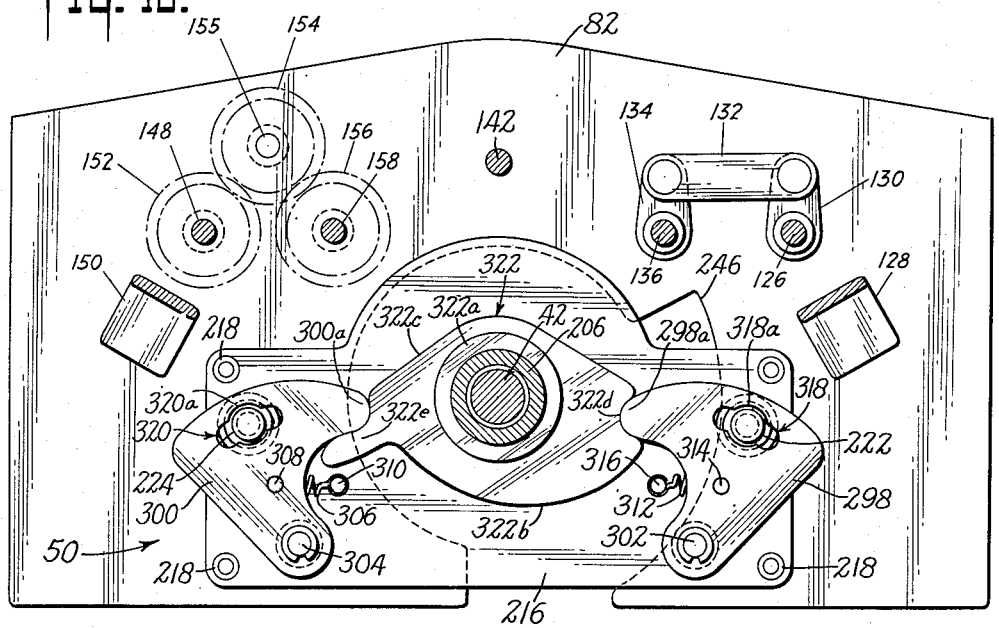
Figure 11:
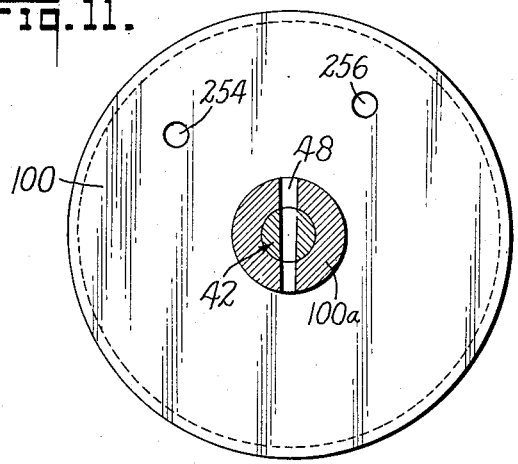
Figures 12, 13:
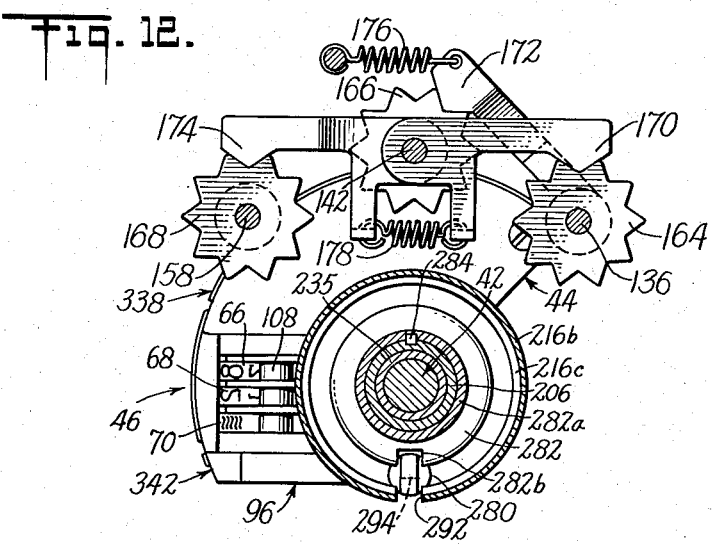
Figure 22:
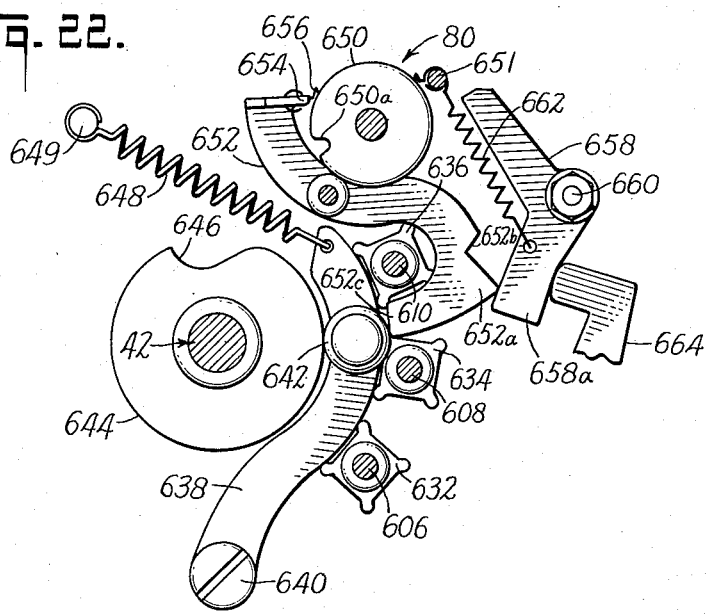
Figure 23:
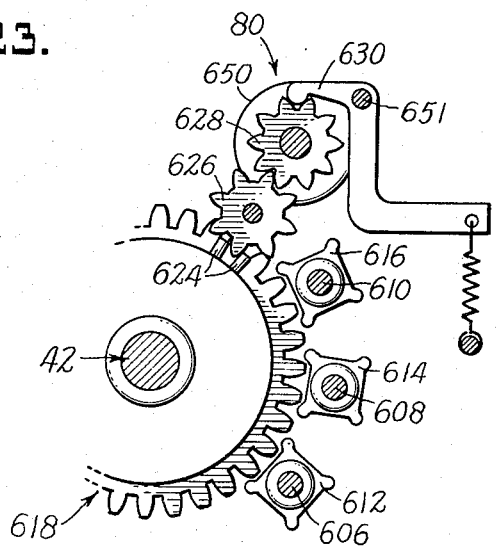
Figure 26:
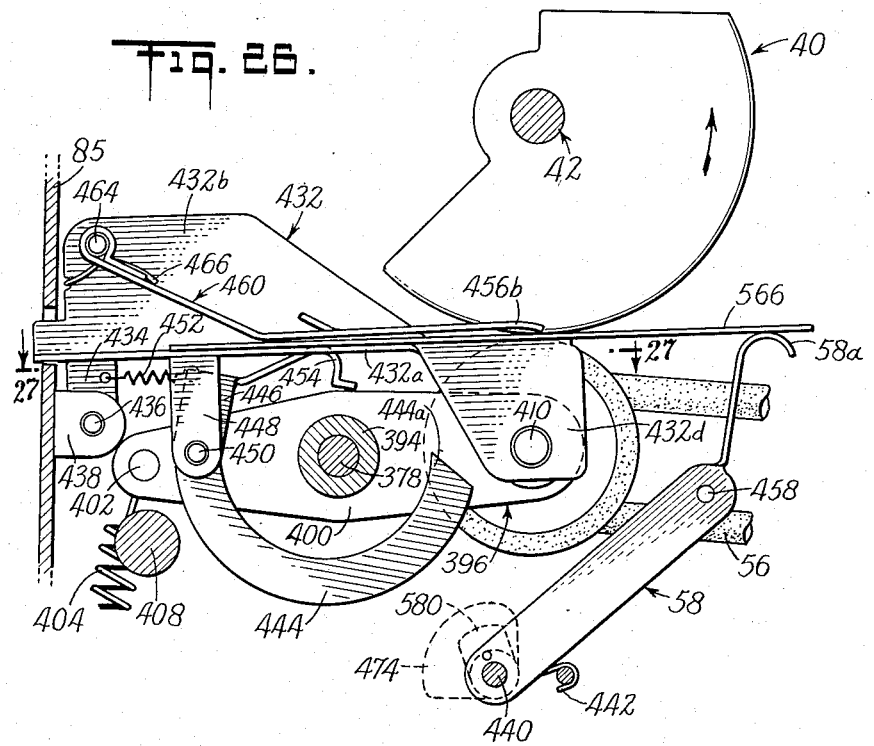
Figure 27:
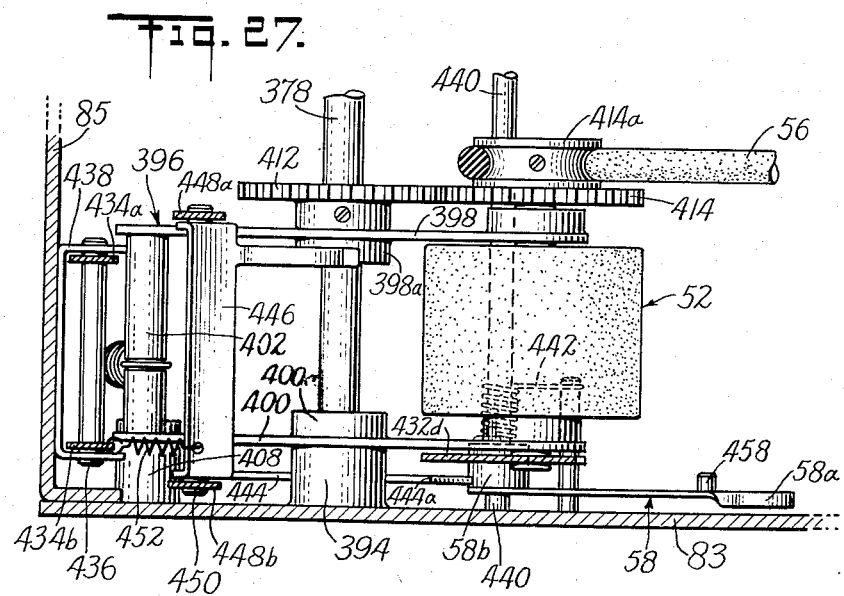
Figure 31:
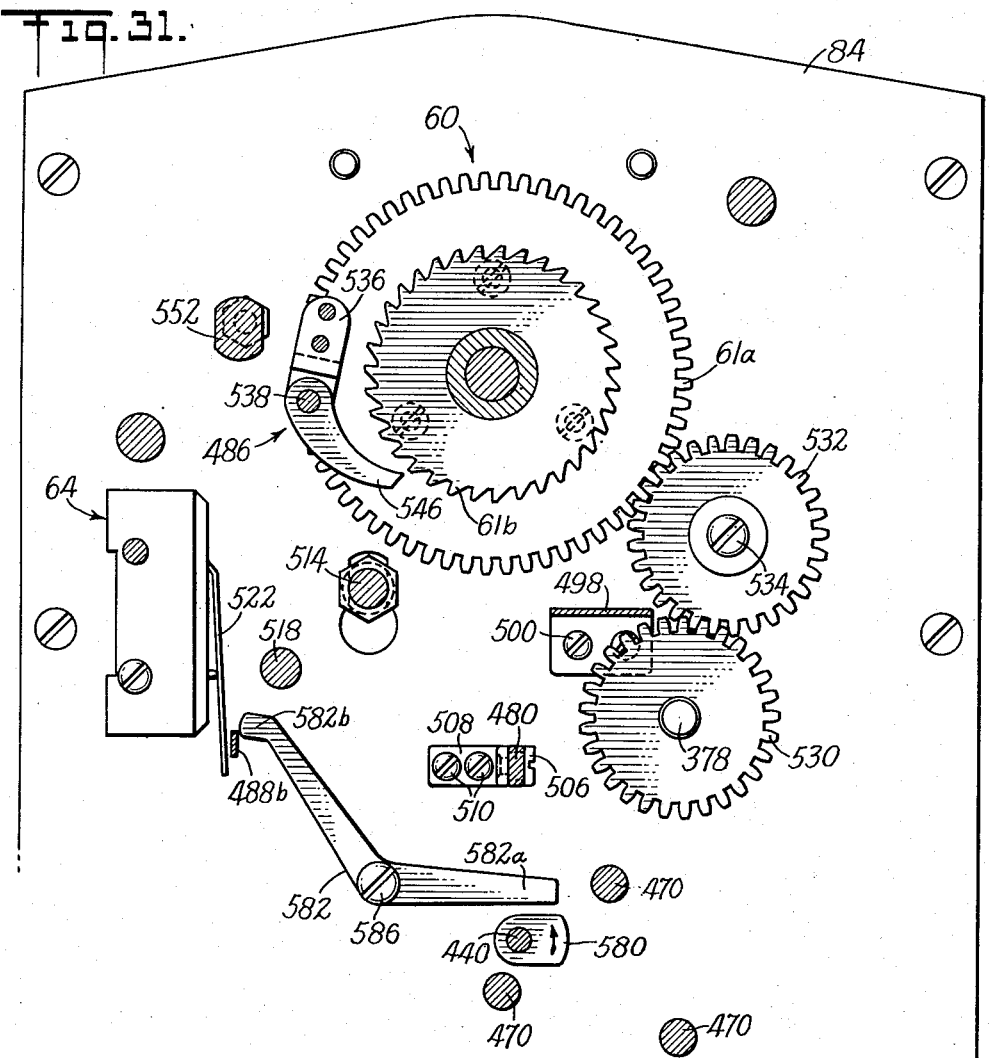
Figure 32:
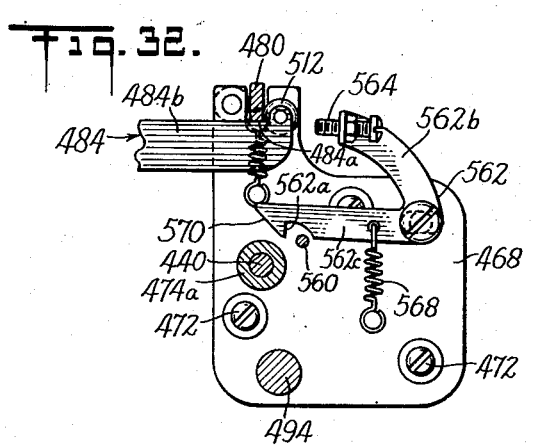
Figure 33:
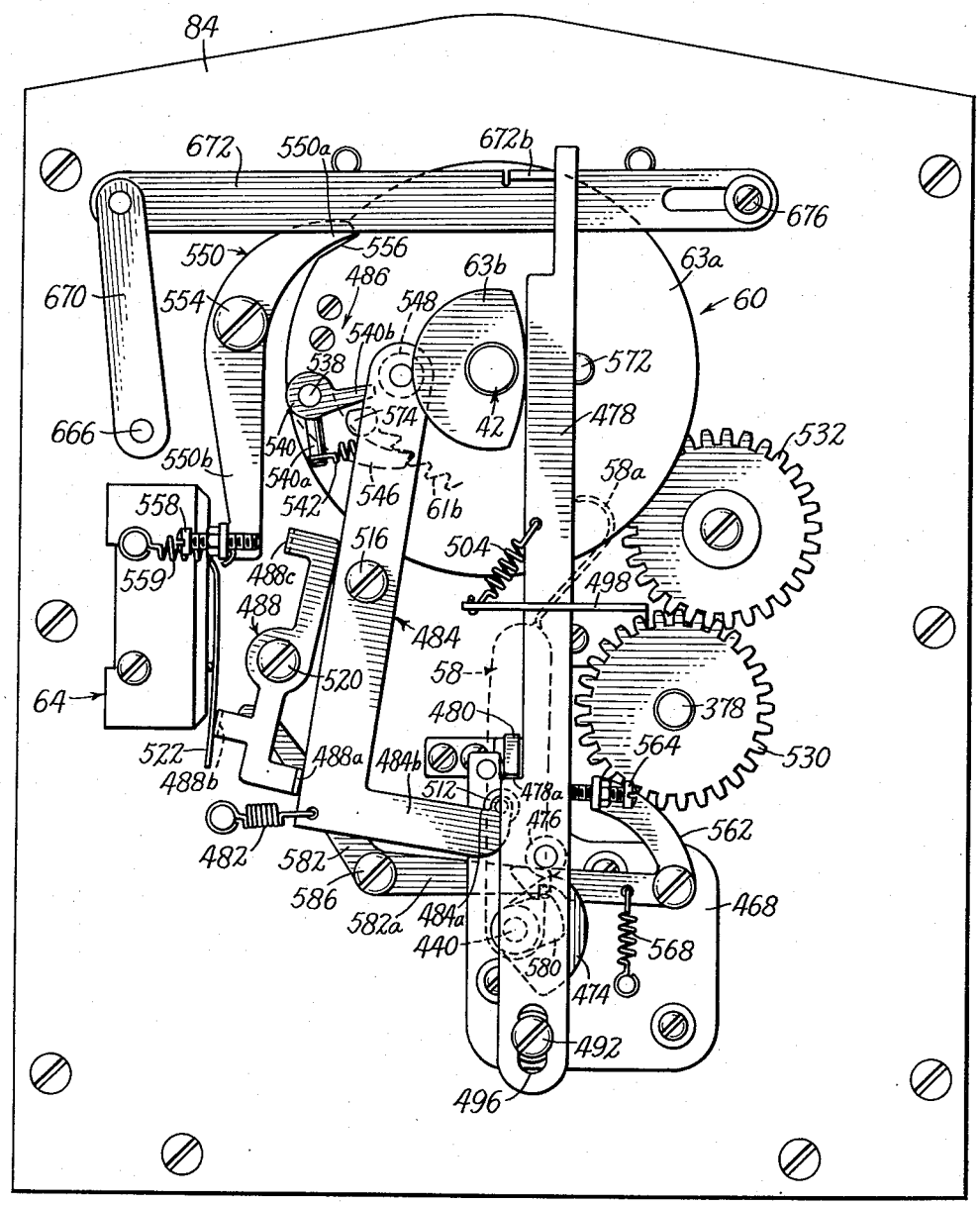
Figure 34:
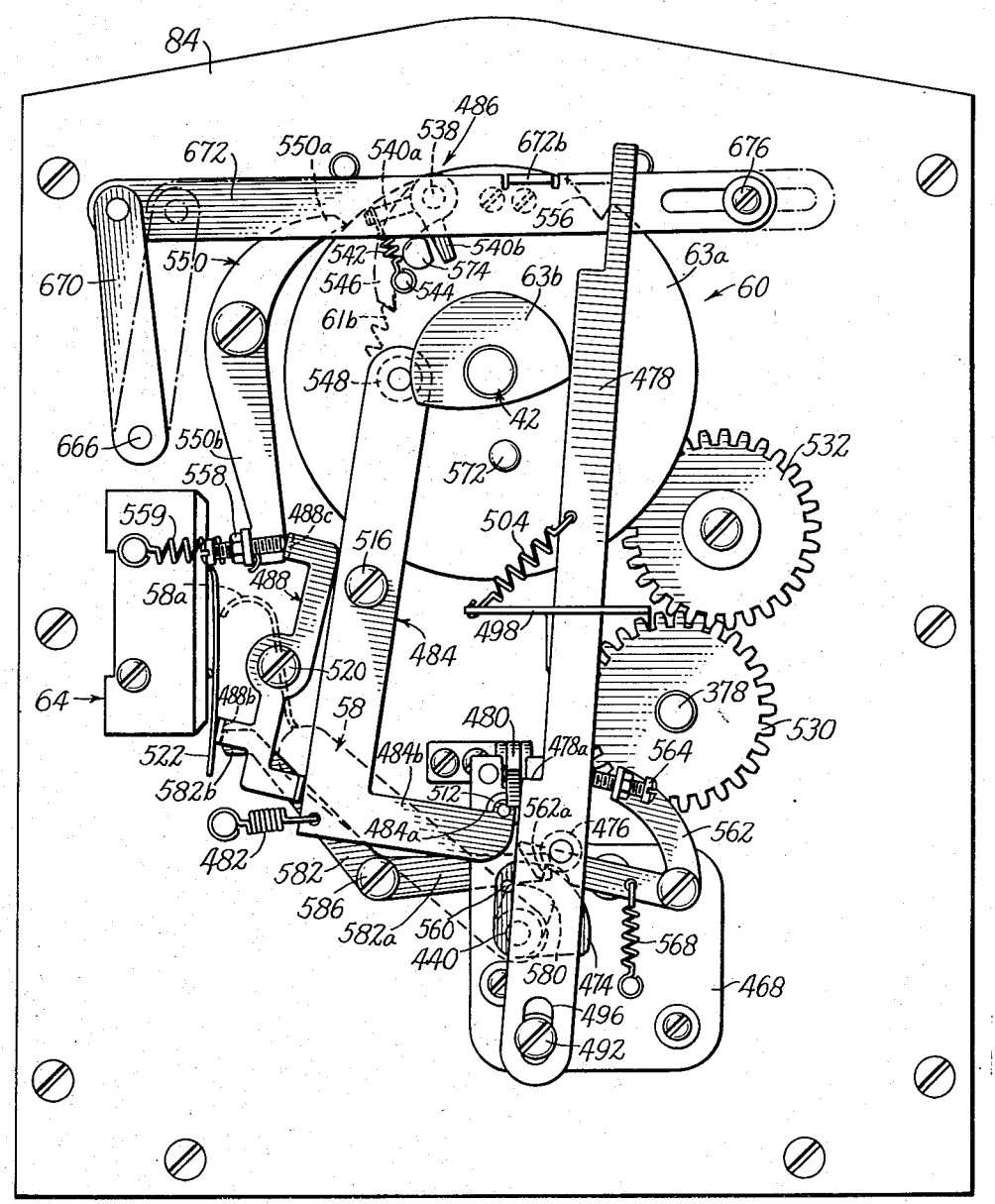

Figures 5, 6, and 7 are perspective views on an enlarged scale of the detachable section of the printing drum and the mechanism associated therewith;

Figure 8 is a vertical section taken on the line 8—8 of Figure 3;

Figure 9 is a vertical section taken on the line 9—9 of Figure 3;

Figure 10 is a view similar to Figure 9 with certain parts in different relative positions;

Figure 11 is a vertical section taken on the line 11—11 of Figure 4a;

Figure 12 is a vertical staggered section taken on the line 12—12 of Figure 4a;

Figure 13 is a horizontal section taken on the line 13—13 of Figure 4a;

Figure 14 is a vertical section on an enlarged scale taken on the line 14—14 of Figure 4a;

Figure 15 is a vertical section on an enlarged scale taken on the line 15—15 of Figure 4a;

Figure 15a illustrates diagrammatically the mounting of the removable section of the printing drum on the machine;

Figure 15b illustrates diagrammatically the dies on the printing drum;

Figure 16 is a horizontal section taken on the line 16—16 of Figure 14;

Figure 17 is a vertical section taken on the line 17—17 of Figure 14;

Figure 18 is a vertical section taken on the line 18—18 of Figure 3;

Figure 19 is a vertical section taken on the line 19—19 of Figure 3;

Figure 20 is a staggered vertical section taken on the line 20—20 of Figure 3;

Figures 21 and 22 are views substantially similar to Figure 20 with certain parts in different relative positions;

Figure 23 is a vertical section taken on the line 23—23 of Figure 3;

Figure 24 is a horizontal section of the letter feeding mechanism taken on the line 24—24 of of Figure 2a;

Figure 25 is a vertical section taken on the line 25—25 of Figure 24;

Figure 26 is a view similar to Figure 25 with certain parts in different relative positions;

Figure 27 is a horizontal section taken on the line 27—27 of Figure 26;

Figure 28 is a rear elevation of the machine with the housing removed with the parts in "rest" position;

Figure 29 is a staggered vertical section taken on the line 29—29 of Figure 28;

Figure 30 is a vertical section taken on the line 30—30 of Figure 28;

Figure 31 is a vertical section taken on the line 31—31 of Figure 29;

Figure 32 is a vertical section taken on the line 32—32 of Figure 29; and,

Figures 33, 34, and 35 are views similar to Figure 28 with certain parts in different relative positions.

Similar reference characters refer to similar parts throughout the several views of the drawings.

In this machine the printing drum for printing postage upon letters, the meter for totaling the amounts of postage printed, and the mechanism for feeding letters through the machine while driving the meter and drum are combined in one unit. In general, the unit comprises a printing drum, generally indicated at 40 (Figures 3, 4, 14, and 25) which is mounted on and turns with a printing drum shaft, generally indicated at 42 (Figure 4), extending longitudinally of the machine and mounted on the front and rear plates of the framework. The printing drum comprises two sections, generally indicated at 44 and 46 (Figures 7, 14, and 15b), section 44 being detachably mounted on printing drum shaft 42, and section 46 (Figure 4) being connected to printing drum shaft 42 by a pin 48. The removable section 44 of the drum (Figures 5, 6, and 7) is detachable from the machine with mechanism generally indicated at 50 which is utilized to mount section 44 of the printing drum on the printing drum shaft 42 and to set the date circle, date wheels, and P. L. & R. dies on the printing drum.

Printing drum 40 coacts with a platen, generally indicated at 52 (Figures 4 and 26), positioned therebeneath to print upon the letters passing through the machine. Platen 52, in addition to coacting with drum 40 to print a postage stamp, also coacts with the drum to feed the letters through the machine. Platen 52 (Figure 25), which is driven by mechanism to be described hereinafter, drives a feed roller, generally indicated at 54, by a belt 56 to insure that letters will be fed completely out of the machine after printing has taken place.

The machine is placed in operation by a tripping lever, generally indicated at 58, which, when tripped by a letter passing through the machine, causes a driving connection to be formed between the two portions of the clutch, generally indicated at 60 (Figures 4 and 28). Clutch 60 is of the single revolution type, the driving portion 61 (Figure 3) of clutch 60 being driven by a motor 62 (Figure 29) and the driven portion 63 (Figure 4) of the clutch being connected to printing drum shaft 42, all as will be described fully hereinafter. At the same time tripping lever 58 (Figure 25) actuates mechanism to connect the driving and driven portions of the clutch, it also causes a switch, generally indicated at 64 (Figure 28) to be closed to complete the circuit to motor 62 (Figure 29). The circuit to motor 62 is maintained until each letter is fed from the machine.

The type wheels 66, 68, and 70 (Figure 14) on section 46 of printing drum 40 are set by three knobs 72, 74, and 76 (Figure 1) extending from the front of the machine. At the same time that the type wheels are set, mechanism for registering the sum being printed on the ascending and descending registers, generally indicated at 78 and 80 (Figure 3), is conditioned for registering the sum being printed during the printing cycle.

Referring now to Figures 2, 3, 4, and 29, the framework of the machine includes upper and lower front plates 82 and 83 and a rear plate 84 which are maintained in spaced relationship with respect to each other by side frames similar to side frame 85 (Figure 2). A supporting plate 86 (Figures 3 and 29) is mounted upon rear plate 84 by means of rods and spacing sleeves, generally indicated at 88 and 90. The housing of the machine, generally indicated at 92 (Figures 1 and 3), is mounted upon the machine's framework in any suitable manner so that it may be removed from the machine for repair and inspection purposes. Provision is made in mounting housing 92 so that when it is mounted on the machine, it is sealed thereon to prevent unauthorized tampering with the machine's mechanism.

Referring to Figure 2, it will be noted that the upper edge of front plate 83 is spaced from the lower edge of front plate 82 and that the side frames have slots therein such as slot 85a in frame 85. The opening thus formed in the machine is the chute through which mail passes when it is being stamped by the machine. Housing 92 is provided with a slot 92a (Figure 1) which is aligned with this chute.

Printing drum shaft 42 (Figure 4) is horizontally positioned in the machine and is rotatably mounted upon a bearing 86a on supporting plate 86 and a bearing 94 mounted on the rear plate 84 of the machine. The forward end of shaft 42 is supported by the detachable section 44 of the printing drum and the mechanism 50 associated therewith.

Section 46 of the printing drum (Figures 14, 15, and 16) on which the type wheels are mounted includes a U-shaped casting, generally indicated at 96. This casting includes a foot portion 96a (Figure 16) and a pair of leg portions 96b and 96c. The leg portions of casting 96 are parallel with respect to each other and extend forwardly in the machine (Figure 16). Casting 96 is mounted on a disc 100 mounted on printing drum shaft 42, a section of the foot portion 96a of casting 96 extending through an opening 98 and disc 100. The hub 100a of disc 100 is connected to shaft 42 by pin 48.

The leg portions 96b and 96c (Figures 14, 15, and 16) of casting 96 form supports for four shafts 102, 104, 106, and 108. Shaft 106 (Figure 15) has three type wheels 66, 68, and 70 rotatably mounted thereon and maintained in spaced relationship with respect to each other by gears 66a, 68a, and 70a connected to the type wheels. Gears 66a, 68a, and 70a are in mesh with three idler gears 110, 112, and 114 (Figures 15 and 16) which are rotatably mounted upon shaft 104. Idler gears 110, 112, and 114 engage and are turned by three setting gears similar to setting gear 116, which are rotatably mounted upon shaft 102. To align the digits on the type wheels when they are in printing position, detents 118, 120, and 122 are provided (Figures 14 and 16). These detents are all similar in construction and operation to detent 120 and are mounted upon shaft 108. The nose portion 120a (Figure 16) of detent 120 engages the teeth of gear 68a and is resiliently urged into engagement with gear 68a by a spring 124 acting between detent 120 and a rod 125 mounted on leg portions 96b and 96c of casting 96. Thus each type wheel may be set by its setting gear and all of the type wheels are maintained in alignment by their respective detents.

As pointed out hereinabove, setting knobs 72, 74, and 76 (Figure 1) are provided for setting type wheels 66, 68, and 70 (Figure 14). Setting knob 76 is used for setting type wheel 70, which is used to print half cents. Thus knob 76 (Figures 1 and 3) is adjustable to either print or not print the fraction one-half. To accomplish this, knob 76 (Figures 2 and 3) is mounted on a shaft 126 which is journaled on upper front plate 82 and supported by a bracket 128. Shaft 126 (Figure 9) has an arm 130 secured thereto which is pivotally connected to a link 132 in turn pivotally connected to an arm 134 connected to a shaft 136. As shaft 126 is turned by setting knob 76 (Figure 3), arm 130 (Figures 3 and 9) acts through link 132 and arm 134 to turn shaft 136. An indicating wheel 138 is mounted on the forward end of shaft 136 (Figures 3 and 8) and this indicating wheel may be viewed through a window 140 (Figure 1) in housing 92 so that the operator may readily ascertain the position at which setting knob 76 is set. Shaft 136 (Figure 3) is rotatably mounted upon upper front plate 82 and supporting plate 86.

Figure 1:
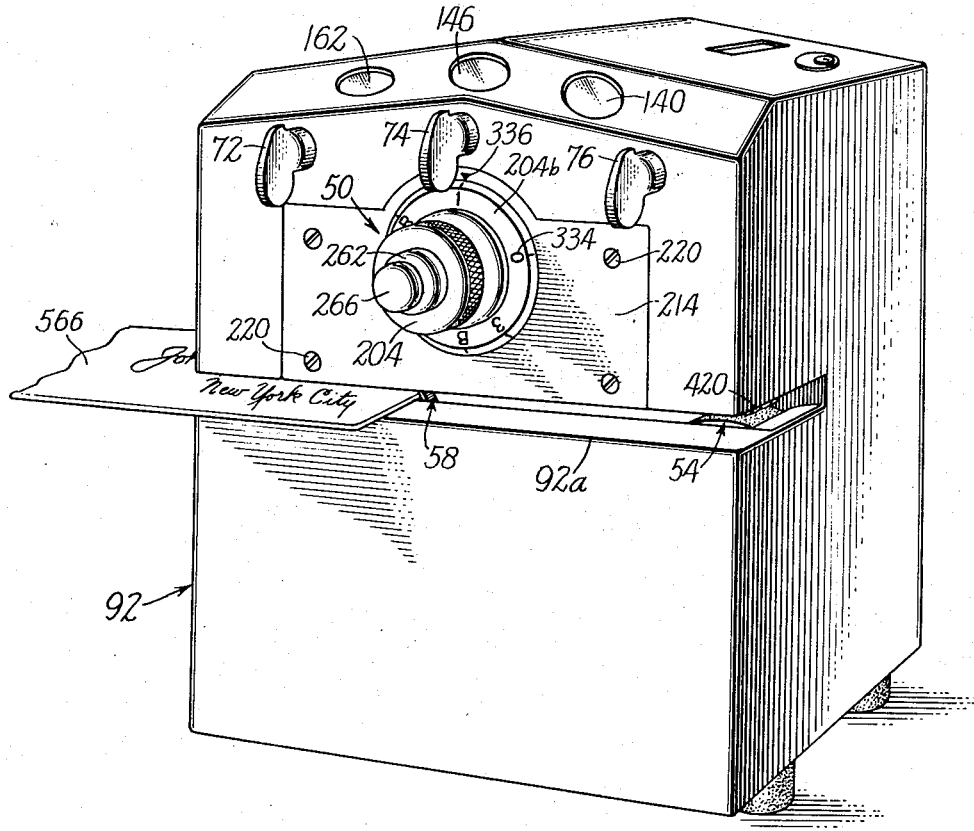

Setting knob 74 is mounted on the forward end of a shaft 142 rotatably mounted upon upper front plate 82 and supporting plate 86. This setting knob is used for setting the cents type wheel 68 and to indicate the setting of the type wheel, it is provided with an indicating wheel 144 which may be viewed through window 146 (Figure 1). Setting knob 72, which is used to set the ten cent type wheel 66, is mounted on the forward end of a shaft 148 which is rotatably mounted on the machine on a bracket 150 (Figures 2, 3, and 8) and upper front plate 82. Shaft 148 has a gear 152 mounted thereon and this gear engages an idler gear 154 (Figures 3 and 9) rotatably mounted on a stud shaft 155 extending forwardly from and secured to upper front plate 82. Idler gear 154 meshes with a gear 156 mounted on and connected to a shaft 158 which is rotatably mounted on upper front plate 82 and supporting plate 86. The forward end of shaft 158 has an indicating wheel 160 (Figures 3 and 8) mounted thereon to permit the user to ascertain the setting of knob 72 through window 162 (Figure 1).

To insure proper alignment of shafts 136, 142, and 158 on the digit at which setting knobs 72, 74, and 76 are set, shafts 136, 142, and 158 are provided with ratchet wheels 164, 166, and 168 (Figures 3 and 12). Detents 170, 172, and 174 are provided to engage the teeth on ratchet wheels 164, 166, and 168 and are resiliently urged into engagement with the teeth of the ratchet wheels by a pair of springs 176 and 178. Detents 170 and 174 are pivotally mounted on shaft 142 and detent 172 is pivotally mounted on shaft 136.

Shafts 136, 142, and 158 (Figures 3, 4, and 18) have pinions 180, 182, and 184 secured thereto. Pinions 180, 182, and 184 engage teeth on and move racks 186, 188, and 190 (Figures 3 and 29) transversely of the machine. Racks 186, 188, and 190 are slidably mounted in slots in a block 192 secured to supporting plate 86 (Figures 3 and 18) and by a rod 194 which extends forwardly from supportnig plate 86 through slots in each rack similar to slot 196 in rack 190. Racks 186, 188, and 190 (Figure 3) are maintained in spaced relationship with respect to each other and with respect to supporting plate 86 by a series of spacing washers 198, 200, and 202. It will be noted that shaft 142 (Figure 18) is positioned above shafts 136 and 158, and thus rack 188 has an upwardly extending portion 188a having teeth thereon which pinion 182 engages. Rack 186, 188, and 190 (Figure 29) each have forwardly extending flanges 186b, 188b, and 190b thereon which are positioned to the left of shaft 42, as viewed in Figure 18. Flanges 186b, 188b, and 190b move in parallel planes and are parallel to a plane passing through the axis of shaft 42 (Figure 18). The forwardly extending portions 186b, 188b, and 190b extend forwardly through slots 171, 173 and 175 in a disc 197 secured to the machine and have teeth 186c, 188c, and 190c thereon which when the machine is in "rest" position engage the three setting gears similar to setting gear 116 (Figure 16) mounted upon casting 96. Thus, as racks 186, 188, and 190 are moved transversely across the machine, they turn the setting gears which act through idler gears 110, 112, and 114 (Figure 15) to set type wheels 66, 68, and 70. Thus, when the machine is in "rest" position, when one of the setting knobs (Figure 3) is turned, its respective setting shaft is turned. These shafts 136, 142, and 158 act through pinions 180, 182, and 184 to move the racks 186, 188, and 190 transversely of the machine. As racks 186, 188, and 190 move transversely of the machine, they act through the setting gears such as setting gear 116 (Figure 16) to set the type wheels at the digits at which the setting knobs are set.

To prevent movement of setting knobs 72, 74, and 76 and to prevent type wheels 66, 68, and 70 from turning during a cyclical operation, the setting gears, such as gear 116, on the printing drum and racks 186, 188 and 190 are locked in their set positions at the beginning of a cycle and cannot be moved until the cycle is completed. This ensures that the sum being printed will be the sum registered which is of major importance. To hold racks 186, 188, and 190 in their set positions, disc 100, which turns with printing drum shaft 42, has an annular tooth 100b (Figures 4, 18, and 29) extending rearwardly from its periphery. This tooth is continuous except for three slots 191, 193, and 195 (Figures 18 and 29) which are aligned with the teeth on racks 186, 188, and 190 when the machine is in "rest" position. Thus when the machine is in "rest" position, the racks may be moved transversely of the periphery of disc 100. However, as soon as a cyclical operation begins, tooth 100a (Figure 16) moves through the spaces between aligned teeth on the racks and locks the racks so that they may not be moved until the cycle is completed.

To lock the setting gears on the printing drum a stationary disc 197 having a forwardly extending annular tooth 197a (Figures 4 and 18) is provided. Disc 197 (Figure 4) is connected to the bearing portion 86a of plate 86 and has a bearing 207 in its hub on which shaft 42 is mounted. The tooth 197a on disc 197 has slots 199, 201, and 203 therein (Figure 18) which are aligned with the teeth of the three setting gears on the printing drum when the machine is in "rest" position. This permits racks 186, 188, and 190 (Figure 29) to turn the setting gears and thus set type wheels 66, 68, and 70 (Figure 15). During a cyclical operation, tooth 197a (Figures 16 and 17) meshes with the teeth on each of the setting gears and prevents their turning until the machine again reaches "rest" position. Thus, both the racks and setting gears are locked during each cyclical operation and this insures that the amount printed will be the amount registered.

In machines of this type it is desirable to have some of the dies on the printing drum manually settable in either printing or non-printing position. This permits one machine to be used for stamping a number of different types of mail. For instance, one type of mail requires a P. L. & R. number, another type of mail requires that the date circle and date wheels be in non-printing position during an operative cycle, and a third type of mail requires that only the date wheels be retracted to a non-printing position.

To permit the user of the machine to place the P. L. & R. die, date wheels, and date circle in either printing or non-printing position, the machine is provided with a control knob 204 (Figures 1 and 4a). This control knob is keyed to a sleeve 206 which has cams 208, 210, and 212 formed on its inner end. These cams may be positioned by control knob 204 so that they act upon mechanism associated with the P. L. & R. die, date circle die, and date wheel die to cause them to either print or non-print during an operative cycle.

In the present machine it will be noted that the printing drum is enclosed within the machine. The date wheels on the printing drum must be set at the date on which mail is being printed and thus the date wheels must be accessible to the user so that changes in the date wheels can be made. The printing drum also carries a slogan die. Slogan dies, as a rule, are removable so that different slogans may be used. To permit the user to change the setting of the date wheels and the slogan die, the printing drum, as pointed out hereinabove, is made in two sections 44 and 46. Section 44 is the detachable section and is mounted upon the inner end of sleeve 206 (Figure 4a) which is rotatably mounted on shaft 42 by bearings 235 and 236.

To mount section 44 of the printing drum upon the machine and to permit the user to control the printing of the dies thereon, the forward end of sleeve 206 extends through and is rotatably mounted on a framework, generally indicated at 50 (Figures 5, 6, and 7). This framework includes a pair of spaced parallel plates 214 and 216. Plates 214 and 216 are maintained in spaced relationship with respect to each other by screwing sleeves 218 and screws 220. Framework 50 is mounted on a pair of locating pins 222 and 224 (Figure 2) which extend forwardly from upper front plate 82. These pins extend through openings, similar to opening 226 (Figure 7), in plate 216 and thence through sleeves 228 and 230 (Figures 5 and 6) which are mounted on plate 216 in alignment with the locating pin openings. The forward ends of sleeves 228 and 230 are spaced from plate 214 and the heads of the locating pins 222 and 224 are exposed when the framework 50 is mounted on the machine. This permits locking mechanism to be described hereinafter to lock framework 50 to the heads of the locating pins and thus to the machine.

As pointed out hereinabove, the detachable section 44 of the printing drum is rotatably mounted on the inner end of sleeve 206. Section 44 has a hole 232 (Figures 4a and 7) extending through its hub portion 231 of a diameter slightly greater than the diameter of printing drum shaft 42. The hub portion of section 44 also has an annular recess 234 therein the diameter of which is slightly greater than the diameter of bearing 236. This rotatably mounts the inner end of section 44 on sleeve 206.

The forward end of section 44 is secured by a screw 240 (Figure 17) to a ring 238 mounted on an enlarged portion 206b of sleeve 206. Ring 238 is rotatably mounted on portion 206b and is prevented from moving longitudinally with respect to sleeve 206 by a split ring 242, the inner edge of which extends into an annular groove 206a in sleeve 206. Split ring 242 is secured to ring 238 by screws 244 (Figures 4a and 7). Thus, the forward and rear ends of detachable section 44 are rotatably mounted on sleeve 206, and split ring 242 prevents longitudinal movement of section 44 with respect to sleeve 206. This insures that the cams 210 and 212 (Figure 17) operating dies on the detachable head section 44 will always be aligned with the mechanism which operates these dies and also permits the detachable section of the printing drum to be turned with head shaft 42 so that it rotates with respect to sleeve 206 and the cams thereon, all as will be fully described hereinafter.

When the detachable section 44 (Figure 14) of the printing drum is mounted on printing drum shaft 42, it is positioned adjacent to section 46 of the printing drum which is connected to printing drum shaft 42. Because of the radius of section 44 (Figure 7), it will be noted that there is not enough space between head shaft 42 (Figure 2) and the setting knobs positioned thereabove to permit the detachable section 44 to be slid directly onto shaft 42 into the position it occupies in Figure 14. Instead, an opening 246 (Figures 2 and 9) is provided beneath the setting knob on the right-hand side of the machine and this opening is of sufficient size to permit the detachable section 44 of the printing drum to be slid into the machine on shaft 42. When section 44 of the drum has been slid into the machine through opening 246, it occupies the position indicated by the dotted line 248 (Figure 15a). Section 44 of the drum is then turned in a counterclockwise direction until it engages section 46 of the drum. At this time section 44 is again moved rearwardly in the machine so that two pins 250 and 252 (Figure 7) extending rearwardly from section 44 enter a pair of holes 254 and 256 (Figures 4a and 11) in disc 100. This connects section 44 to disc 100, and as disc 100 is connected to head shaft 42 by pin 48 (Figure 4a), whenever shaft 42 turns, section 44 turns with it.

As pointed out hereinabove, section 44 (Figure 4a) is prevented from moving longitudinally with respect to sleeve 206 by split ring 242. To hold sleeve 206 in assembled relationship on shaft 42 and thus hold pins 250 and 252 (Figure 7) of section 44 in holes 254 and 256 (Figure 11), a catch 258 (Figure 4a) is provided. Catch 258 is pivotally mounted by pin 260 on a supporting member 262 which is secured to the outer end of sleeve 206 by a set screw 264. Catch 258 is actuated by a button 266 secured to the outer end of a rod 268. Rod 268 has a catch actuating member 270 secured to its inner end which operates catch 258 by a pin 270a which extends into a notch 258b in catch 258. Member 270 is generally cylindrically shaped and moves in a bore 272 extending into member 262 from its left-hand end, as viewed in Figure 4a. To prevent member 270 from rotating within bore 272, member 270 is provided with a pin 274 which moves in a slot 276 extending longitudinally of member 262. A spring 278 acts between member 262 and button 266 to resiliently urge button 266 to the left (Figure 4a). Spring 278 acts through button 266, rod 268, member 270, pin 270a, and catch 258 to move the nose portion 258a of catch 258 into engagement with the rear surface of a head 42a formed on shaft 42. The nose portion 258a of catch 258 and the left-hand end of the head 42a on shaft 42 are so shaped that catch 258 is cammed outwardly when sleeve 206 is slid onto shaft 42 until catch 258 moves into latching position. Thus, when sleeve 206 is slid inwardly upon shaft 42, turned to align the pins on the rear of removable head section 44 with the holes in disc 100 (Figure 15a), and then moved rearwardly again to position the pins on section 44 in the holes in disc 100, catch 258 engages the head 42a of shaft 42 (Figure 4a) and prevents sleeve 206 and thus section 44 from moving outwardly or to the left.

When it is desired to disengage catch 258 from head 42a, button 266 is pressed inwardly and this causes member 270 to move inwardly and act through pin 270a to move catch 258 in a counterclockwise direction (Figure 4a). This raises the nose portion 258a of the catch so that it no longer engages the head 42a of shaft 42 and permits section 44 of the drum to be removed from the machine.

As pointed out hereinabove, section 44 is rotatably mounted on sleeve 206. Thus, in order to turn section 44 in a counterclockwise direction (Figure 15a) into the position where its pins can be moved into the holes in disc 100 and to turn section 44 to a position where it can be removed from the meter after its pins have been removed from disc 100, a connection must be established between sleeve 206 and section 44. This connection is established between an arm 280 (Figure 4a) extending forwardly from and secured to ring 238 and a ring-shaped member 282 keyed to shaft 206 by a key 284. Ring-shaped member 282 includes a hub portion 282a which extends through and is rotatably mounted in a hole 286 formed in a bearing portion 216a of plate 216. Ring member 282 is prevented from moving longitudinally with respect to the bearing portion 216a of plate 216 by a locking ring 288 which is secured to the hub 282a of member 282 by a set screw 290. Member 282, hub 282a, and locking ring 288 coact with the bearing portion 216a of plate 216 to rotatably mount sleeve 206 upon plate 216 of framework 50.

Ring member 282 has a slot 282b (Figures 4a and 12) which is aligned with and of suitable width to receive the left-hand end of arm 280. Plate 216 (Figure 4a) has an annular flange 216b formed thereon extending to the right and a flange 216c extends inwardly toward sleeve 206 from the right-hand edge of the flange 216b. Flange 216b has a slot 292 cut therethrough which is aligned with arm 280 when the printing drum is in "rest" position. Arm 280 has a slot 294 cut therein of sufficient width to receive flange 216c. Thus, when it is desired to remove section 44 of the printing drum from the machine, button 266 is pressed inwardly to release catch 258. This permits the user to draw outwardly upon knob 204 which moves sleeve 206 outwardly. As section 44 is always moved longitudinally with sleeve 206, the left-hand end of arm 280, as viewed in Figure 4a, enters the slots 282b and 292 (Figure 12) in ring member 282 and flange 216c. When knob 204 (Figure 4a) is turned, it acts through sleeve 206, ring member 282, and arm 280 to turn section 44 of the printing drum because arm 280 is positioned in slot 282b in ring member 282. Section 44 is turned in a clockwise direction, as viewed in Figure 15a, until it reaches the dotted line position 248, at which time it may be removed from the machine. At this time flange 216c (Figure 4a) will be positioned in slot 294 in arm 280 and thus arm 280 on section 44 connects section 44 to framework 50 when section 44 is removed from the machine.

When section 44 is mounted upon the machine, sleeve 206 is slid upon printing drum shaft 42 until plate 216 of framework 50 (Figure 4a) strikes the base portions 222a and 224a (Figure 2) of locating pins 222 and 224. Knob 204 is then turned in a counterclockwise direction, as viewed in Figure 1, and through key 296 (Figure 4a) turns sleeve 206. Sleeve 206, acting through key 284, turns ring member 282 and thus arm 280. When arm 280 is aligned with slot 292 (Figure 12) in flange 216c, the pins on the rear surface of section 44 (Figure 7) are aligned with the holes in disc 100 (Figure 11) and thus at this time sleeve 206 may be moved rearwardly to position pins 250 and 252 in their respective holes in disc 100 (Figures 11 and 15a) and at the same time catch 258 (Figure 4a) engages the head portion 42a of head shaft 42 to lock sleeve 206 on the drum shaft 42. At this time the printing drum is ready for operation.

As pointed out hereinabove, framework 50 (Figure 5) is locked to locating pins 222 and 224 when the detachable section 44 of the printing drum is in operative position. To lock framework 50 to locating pins 222 and 224, a pair of locking plates 298 and 300 (Figures 9 and 13) are provided. These plates are pivotally mounted on framework plate 216 on a pair of stud shafts 302 and 304 and move in a plane positioned at right angles with respect to the axis of sleeve 206. Locking plate 300 is at all times resiliently urged in a clockwise direction, as viewed in Figure 9, by a spring 306 which is connected to a pin 308 on plate 300 and to a pin 310 extending forwardly from framework plate 216. Plate 298 is at all times resiliently urged in a counterclockwise direction, as viewed in Figure 9, by a spring 312 connected to a pin 314 on locking plate 298 and to a pin 316 extending forwardly from framework plate 216.

Plates 298 and 300 are provided with slots, generally indicated at 318 and 320, each of which includes center portions 318a and 320a of a diameter slightly greater than the diameter of the heads 222b and 224b (Figure 13) of locating pins 222 and 224. Pins 222 and 224 are provided with grooves 222c and 224c which are of slightly greater width than locking plates 298 and 300. Each of slots 318 and 320 are provided with wing portions of slightly greater width than the diameter of grooves 222c and 224c. When framework 50 is mounted on locating pins 222 and 224 (Figure 2), then the heads 222b and 224b (Figure 13) of the locating pins are positioned forwardly of locking plates 298 and 300 having passed through the center portions 318a and 320a of slots 318 and 320 (Figure 9). At this time grooves 222c and 224c (Figure 13) are aligned with locking plates 298 and 300, and thus when plates 298 and 300 are moved in counterclockwise and clockwise directions (Figure 9), respectively, locating pins 222 and 224 are positioned in the right-hand and left-hand wing portions respectively of slots 318 and 320, as viewed in Figure 9. Because these wing portions of slots 318 and 320 are of less width than the heads 222b and 224b (Figure 13) of locating pins 222 and 224, the locking plates at this time prevent removal of framework 50 from the machine.

To actuate locking plates 298 and 300, a cam, generally indicated at 322 (Figures 4a, 9, 10, and 13) is provided. The hub 322a (Figure 4a) of cam 322 is connected to sleeve 206 by a set screw 324. When section 44 of the printing drum is removed from the machine, sleeve 206 is first moved to the left, as viewed in Figure 4a, so that the groove in arm 280 is positioned in alignment with flange 216c. As described hereinabove, arm 280 is next turned with section 44 of the head so that sleeve 206 is retained in its left-hand position by the coaction of slot 294 and flange 216c. When arm 280 (Figure 4a) abuts against plate 216, cam 322 (Figure 9) lies in the same plane as locking plates 298 and 300 and is positioned in the position it occupies in Figure 9. When section 44 (Figure 15a) of the printing drum is turned in a clockwise direction to move it into alignment with opening 246 (Figure 2), cam 322 also turns in a clockwise direction with sleeve 206. The edges 322b and 322c of cam 322 act upon the nose portions 298a and 300a (Figure 10) of locking plates 298 and 300 to move them outwardly and thus align locating pins 222 and 224 with the center portions 318a and 320a of openings 318 and 320. At this time section 44 of the printing drum is aligned with opening 246 and as framework 50 is no longer connected to plate 82, the framework 50 and section 44 of the head may be removed from the machine.

It will be noted that cam plate 322 is provided with a recess 322d (Figure 10) in which the nose portion 298a of locking plate 298 is positioned when the detachable section of the head is removed from the machine. This holds cam 322 in a set position with respect to the locking plates 298 and 300 and thus prevents their returning to locking position until section 44 of the printing drum is again mounted on the machine. Cam 322 is also provided with an arm 322e which coacts with nose 300a of locking plate 300 to limit movement of cam 322 in a clockwise direction.

When section 44 of the printing drum is mounted upon the machine, sleeve 206 (Figures 4 and 12) must be turned in a counterclockwise direction, as viewed in Figure 12, to align arm 280 with slot 292 and to align the pins on the rear of section 44 with the holes 254 and 256 in disc 100 (Figures 11 and 15a). During this movement cam 322 moves from the position it occupies in Figure 10 to the position it occupies in Figure 9. This frees locking plates 298 and 300 and permits springs 306 and 312 to move them inwardly into locked position with respect to locating pins 222 and 224. When the pins 250 and 252 on the rear face of section 44 move into holes 254 and 256 (Figures 7 and 11), sleeve 206 moves inwardly to the position it occupies in Figures 4 and 13. At this time it will be noted that cam 322 is not positioned in alignment with plates 298 and 300 (Figure 13) and thus when sleeve 206 is turned, cam 322 does not move the locking plates.

Knob 204 (Figure 4a) is slidably mounted on sleeve 206 and keyed thereto by a key 296. Knob 204 is resiliently urged toward the right by a spring 328 which is mounted in an annular recess 204a in knob 204 and acts between member 262 and the inner end of recess 204a. Movement of knob 204 toward the right is limited by a ring 326 (Figure 4a) positioned to the left of the hub of cam 322. To hold knob 204 in a set position, a plurality of holes 330 (Figure 8) are provided in framework plate 214, and knob 204 is provided with a pin 332 (Figure 4a) extending rearwardly therefrom. Each of the holes 330 (Figure 8) indicates a different setting of the cams 208, 210, and 212 (Figure 4a) or the removal position for section 44. Thus, to adjust the machine for printing mail, knob 204 is pulled outwardly and turned so that one of the position identifying characters 334 (Figure 2a) on a dial 204b forming a part of knob 204 align with an indicating line 336 on plate 214. When one of the characters 334 is aligned with line 336, then pin 332 (Figure 4a) is aligned with one of the holes 330 (Figure 8) in plate 214. Spring 328 (Figure 4a) causes pin 332 to enter the hole with which it is aligned and thus hold sleeve 206 in whatever position it is set.

Cams 208, 210, and 212 (Figure 15) are so shaped so that when properly set they cause the date circle die, the date wheel dies, and the P. L. & R. die, generally indicated at 338, 340, and 342, respectively (Figures 15 and 15b), to print as they pass printing position during an operative cycle. The date circle die 338 is mounted upon a member 344 (Figure 14) which is pivotally mounted on section 44 by a pin 346 (Figures 14 and 17). Member 344 includes an arm 344a having a roller 348 thereon which is aligned with and actuated by cam 208 (Figure 17) when section 44 of the head is mounted on the machine. The date wheel dies 340 (Figure 15) are rotatably mounted on a supporting member, generally indicated at 350, which is also pivotally mounted on pin 346. Member 350 includes an arm 350a having a roller 352 mounted thereon which is aligned with and actuated by cam 210 (Figure 17). Members 344 and 350 (Figures 14 and 15) are connected by springs 354 and 356 to pins 358 and 360 respectively on section 44 of the printing drum and serve to hold rollers 348 and 352 of the date circle and date wheel dies 338 and 340 in contact with cams 208 and 210.

The P. L & R. die 342 (Figure 15) is mounted on a supporting member 362 slidably mounted in channels 364 and 366 (Figure 4a) formed in casting 96 which forms the framework for the nonremovable section 46 of the printing drum. Member 362 (Figure 15) has an arm 362a which carries a roller 368. Roller 368 engages cam 212 (Figure 17) when the removable section 44 of the printing drum is mounted on the machine. Member 362 is resiliently urged toward a nonprinting position by a spring 370, which is connected to member 362 and to a pin 372 mounted on casting 96.

The machine is so constructed that the high portion on any cam must be positioned downwardly beneath shaft 42 (Figures 14 and 15) if it is desired to have the die related thereto print during an operative cycle. The three dies are resiliently urged toward their respective cams at all times by springs 354, 356, and 370 and are moved into printing position as they move toward the point at which the impression is to be made by the coaction of rollers 348, 352, and 368, with cams 208, 210, and 212 (Figure 17). Thus, it can be seen that by setting the knob 204 (Figure 4), the cams may be positioned to cause any combination of the three dies to print during any given operative printing cycle.

As pointed out hereinabove, the machine is provided with a slot 92a (Figure 1) through which mail passes as it is being stamped. Printing drum 40 (Figure 4) is positioned above slot 92a and coacts with platen 52 (Figure 26) to print during an operating cycle. Both the printing drum and the platen are driven by motor 62 (Figure 29), which is mounted on the framework of the machine in any suitable manner. The drive shaft 372 of motor 62, has a worm gear 374 thereon which drives a gear 376 mounted on the shaft 378. Shaft 378 is parallel to the printing drum shaft 42 and is mounted on framework plates 84 and 86 by bearings 380 and 382. Gear 376 is connected to shaft 378 by a spring clutch, generally indicated at 384 and is prevented from moving longitudinally with respect to shaft 378 by a pair of collars 386 and 388 connected to shaft 378 by set screws 390 and 392. The spring clutch prevents damage to motor 62 in case the mechanism jams preventing it from driving shaft 378. Shaft 378 extends forwardly from plate 86 and is journaled in a bearing 394 (Figure 27), mounted on lower front plate 83.

Platen 52 (Figure 27) is mounted upon a supporting frame, generally indicated at 396. Frame 396 includes a pair of side plates 398 and 400, which are similar in shape (Figure 25) and the left-hand ends of which are connected by a rod 402 (Figure 27). Side plates 398 and 400 have hub portions 398a and 400a through which shaft 378 passes to pivotally mount frame 396 on shaft 378. Frame 396 is resiliently urged in a counterclockwise direction, as viewed in Figure 25, by a spring 404 which is connected to rod 402 and to a bracket 406 connected to the framework of the machine. Movement of frame 396 in a counterclockwise direction is limited by a pin 408 on front plate 84 (Figure 25) which extends beneath the left hand end of plate 400 (Figure 27). Platen 52 is mounted on and driven by a shaft 410 rotatably mounted on the right-hand ends of bracket side plates 398 and 400. Shaft 410, and thus platen 52, is driven from shaft 378 (Figure 24) through gears 414 and 412 which are mounted on and connected to shafts 378 and 410 respectively. Thus frame 396 mounts platen 52 so that it resiliently presses the letter being stamped into engagement with the printing drum during each operating cycle. Furthermore, because the platen may be moved downwardly with respect to the printing drum, mail of different thicknesses is readily accommodated by the machine.

To feed letters from the machine feed rollers 54 and 420 (Figure 25) are provided. To drive the feed rollers the hub 412a of gear 412 is in the form of a pulley, and by means of belt 56 it drives a pulley 413 operatively connected to feed roller 54. Feed roller 54 is rotatably mounted on a shaft 418 (Figure 24) which in turn is mounted on front plate 83. To hold the letters in contact with feed roller 54, feed roller 420 is provided (Figure 25). This roller is rotatably mounted by shaft 422 on a supporting member 424 (Figure 24) and member 424 is pivotally mounted by shaft 426 on a bracket 428 connected to the framework of the machine. Member 424 is resiliently urged downwardly, as viewed in Figure 25, by a spring 430 (Figure 24). The surface 425 of member 424 (Figure 25) serves to guide letters being printed upon between rollers 54 and 420. Thus as roller 54 is driven during each operating cycle, letters printed upon are always fed from the machine.

To guide letters into printing position, a guide plate, generally indicated at 432 (Figure 25) is provided. Guide plate 432 includes a bottom plate 432a (Figure 24) and a rear wall 432b (Figure 25). A U-shaped bracket 434 is connected to the left hand end of plate 432 as viewed in Figure 25, the legs 434a and 434b (Figure 27) of which are pivotally connected by a pin 436 to a bracket 438 connected to the framework of the machine. The right hand end of plate 432a (Figure 25) is mounted on shaft 410. To accomplish this, plate 432 is provided with a tongue portion 432c (Figures 24 and 25) which has a downwardly extending flange 432d through which shaft 410 passes. Thus, because guide plate 432 is pivotally mounted at its left hand end and connected to shaft 410, as platen 52 and thus shaft 410 moves upwardly and downwardly, guide plate 432 is always maintained in the same relationship with respect to the platen.

When a letter is fed into the machine, if it is not placed so that its rear edge is adjacent to or engages rear wall 432b of guide plate 432, then the stamp will not be properly positioned upon the letter. To insure that all letters will have their rear edges substantially in engagement with wall 432b, an arm 444 for locking tripping lever 58 is provided. Arm 444 is in fact, an extension of one of the legs of a U-shaped bracket 446 (Figure 27) which is pivotally mounted by a pivot pin 450 on the legs 448a and 448b (Figures 25 and 27) of a bracket 448 connected to the underside of bottom plate 432a of guide plate 432. Bracket 446 and thus arm 444, is resiliently urged in a counterclockwise direction, as viewed in Figure 26, by a spring 452. Movement of bracket 446, and thus arm 444, is controlled by a tripping finger 454, a portion of which extends upwardly through an opening 456 (Figure 24) in bottom plate 432a.

Referring to Figures 25 and 27, it will be noted that a pin 458 extends rearwardly from tripping lever 58. This pin is so positioned that when tripping finger 454 is in the position it occupies in Figure 25, pin 458 will strike the right-hand end 444a of arm 444 if moved in a clockwise direction by a letter. This engagement of pin 458 and arm 444 prevents the tripping lever from being moved to a tripped position. When a letter is fed into chute 432 in proper position, it engages the upwardly extending portion of tripping finger 454 and depresses it. This causes arm 444 to be turned in a clockwise direction removing its end portion 444a (Figure 26) from the path of movement of pin 458. This permits the letter to move tripping lever 58 to a tripped position.

To press a letter downwardly against bottom plate 432a (Figure 25) so that it will depress tripping finger 454 if the letter is properly positioned on the guide plate, a presser member, generally indicated at 460 (Figures 24 and 25) is provided. Presser member 460 has an opening 462 (Figure 24) therein in alignment with opening 456 (Figure 24) in bottom plate 432 to accommodate tripping finger 454 (Figure 25), and is provided with finger portions 456a and 456b which overlie plate 432a. The left-hand portion of member 460 extends upwardly and is pivotally mounted on a pin 464 connected to guide plate rear wall 432b. A spring 466 (Figures 24 and 25) mounted on pin 464 is provided to resiliently press guide plate 460 downwardly.

Thus, letters entering the machine are directed by guide plate 460 downwardly toward tripping finger 454 (Figure 25). If a letter is not properly positioned, finger 454 will not be depressed and arm 444 remains in the position it occupies in Figure 25 and prevents the tripping lever 58 from being moved to a tripped position. If a letter is properly positioned, finger 454 is depressed and arm 444 is moved out of the path of pin 458 (Figure 26). This permits tripping lever 58 to be moved by the letter to a tripped position. After the printing is completed, rollers 54 and 420 (Figure 25), which are driven from platen 52 by belt 56, feed the mail from the machine. Furthermore, because of the manner in which platen 52 is mounted by frame 396 and the connection of guide plate 432 thereto, mail of different thicknesses can be accommodated and all mail is resiliently pressed into engagement with the dies during printing.

As pointed out hereinabove, printing drum 40 (Figure 3) is cyclically driven, each cycle consisting of a complete revolution of the printing drum. Each cyclical operation is started when a letter strikes the tripping lever 58 (Figure 25). Tripping lever 58, which controls the operation of the machine, includes a portion 58a which extends above bottom plate 432a to position it in the path of the leading edge of letters passing through the machine. Tripping lever 58 is connected by its hub 58b (Figure 27) to a shaft 440, extending rearwardly in and rotatably mounted on lower front plate 83 and rear plate 84 of the framework of the machine and is resiliently urged in a counterclockwise direction (Figure 25) by a coil spring 442. Movement of lever 58 in this direction is limited by engagement of lever 58 with one of the bearings 394 journaling shaft 378. Movement of lever 58 to a tripped position actuates mechanism mounted upon rear plate 84 (Figure 28) which closes the circuit to motor 62 (Figure 29) and connects the driving and driven portions of clutch 60 (Figure 28), all as will be described more fully hereinafter.

Referring now to Figure 25, when tripping lever 58 is actuated by a letter, it is moved in a clockwise direction. Because of the connection of lever 58 to shaft 440, shaft 440 is also turned in a clockwise direction, as viewed in Figure 26. Shaft 440 extends rearwardly of rear plate 84 (Figure 29) and thence through a supporting plate 468 (Figures 28 and 29). Supporting plate 468 is parallel to rear plate 84 and is secured thereto by a plurality of spacing sleeves, similar to spacing sleeve 470 (Figure 29), and screws 472 (Figure 28). Shaft 440 has a cam 474 (Figures 28 and 29) connected to its rear end which, when it turns in a counterclockwise direction, as viewed in Figure 28, acts upon a roller 476, mounted on a tripping link 478, to move link 478 upwardly and place the machine in operation.

In general, when link 478 (Figure 33) moves upwardly, it moves a latch 480 upwardly, permitting spring 482 to turn the control lever generally indicated at 484, in a clockwise direction about screw 516 as a pivot point. When the upper end of control lever 484 moves to the right, it permits the pawl mechanism, generally indicated at 486, to connect the driving and driven portions of clutch 60. Control lever 484, at the same time that it releases pawl mechanism 486, acts upon the lever generally indicated at 488, to move it in a clockwise direction, and close switch 64 to complete the circuit to the motor 62 (Figure 29) which drives the driving portion of the clutch and platen 52 (Figure 27). As will be described hereinafter, mechanism is provided to maintain switch 64 in a closed position until the letter being printed upon is completely fed from the machine and other mechanism is provided for resetting control lever 484 and latch 480.

Referring to Figure 29, the hub 474a of cam 474 is connected to the rear end of tripping shaft 440 by a set screw 490. Link 478 (Figures 28 and 29) is pivotally mounted by a screw 492 on a post 494 secured to supporting plate 468. It will be noted that the opening 496 (Figures 28 and 29) in the lower end of link 478 through which screw 492 passes, is elongated and thus, link 478 may be pivoted about screw 492 and may also be moved vertically with respect to the machine. For supporting the upper end of link 478 a bracket 498 connected to back plate 84 by screws 500 is provided. Bracket 498 includes a portion 498a (Figures 3 and 28), extending rearwardly from the machine and having a slot 502 thereon in which link 478 is positioned. Link 478 is resiliently urged downwardly and toward the left, as viewed in Figure 28, by a spring 504 connected to link 478 and to the left-hand end of portion 498a of bracket 498.

As pointed out hereinabove, when the tripping lever is actuated by a letter, rod 440 turns in a counterclockwise direction as viewed in Figure 28. Cam 474, which turns with rod 440, is so shaped that it acts upon roller 476 (Figures 28, 29 and 33) to move link 478 upwardly. When the link 478 is raised by cam 474, link 478 (Figure 33) acts through a shoulder 478a to raise latch member 480. Latch member 480 is pivotally mounted by a pivot pin 506 (Figure 31) on a bracket 508 mounted on rear plate 84 by screws 510. When a latch 480 is raised by link 478, it is moved upwardly out of a notch 484a (Figure 33) formed in the lower portion 484b of control lever 484. This permits spring 482 to turn control lever 484 in a clockwise direction and places the machine in operation. To aid link 478 in moving latch 480 out of notch 484a, a roller 512 is mounted to the right of notch 484a, as viewed in Figure 28. This roller turns as latch 480 is raised, thus reducing friction at this point to a minimum and increasing the sensitivity of the tripping lever 58 (Figure 25).

Control lever 484 is pivotally mounted on a post 514 (Figure 30) by a screw 516, post 514 being mounted and extending rearwardly from rear plate 84. When lever 484 is released by latch 480, it moves to the position it occupies in Figure 33. The lower portion 484b of lever 484 acts upon switch lever 488 which is pivotally mounted on a post 518 (Figure 30) by a screw 520, post 518 being mounted and extending rearwardly from plate 84. Lever 488 has a tongue portion 488a (Figures 28 and 30) thereon, which is positioned in the path of movement of the lower portion of lever 484 when lever 484 is released by latch 480. When the lower portion 484b of lever 484 engages tongue portion 488a, it turns lever 488 in a clockwise direction causing another tongue portion 488b (Figures 30 and 33) on lever 488 to engage the arm 522 of switch 64 and move it to a closed position. As the circuit to motor 62 (Figure 29) is controlled by switch 64, when the switch is closed, motor 62 is placed in operation. Thus, when the tripping lever is actuated by a letter, link 478 is raised and switch 64 is closed by the mechanism described hereinabove.

Clutch 60 (Figures 4 and 28) includes a driving member 61, rotatably mounted on printing drum shaft 42 and a driven member 63 mounted on shaft 42 and connected thereto by set screw 526. To drive the driving member 61 of clutch 60 shaft 378 (Figure 29) has a gear 530 (Figure 28) mounted on and connected to its rear end and gear 530 drives an idler gear 532 mounted on rear plate 84 by a screw 534. The driving member 61 (Figures 4 and 28) of clutch 60, includes a gear 61a (Figures 3 and 4) which meshes with gear 532 (Figure 28). Thus, whenever motor 62 (Figure 29) drives shaft 378, the driving member 61 (Figures 4 and 28) of clutch 60, is driven.

The driven portion 63 of clutch 60 includes a disc 63a (Figure 28) which has pawl mechanism 486 mounted thereon. Pawl mechanism 486 includes a shaft 538 (Figures 28 and 31) rotatably mounted on disc 63a by a bracket 536 secured to the forward face of disc 63a. Rearwardly of disc 63a a bellcrank 540 is mounted on and connected to shaft 538. One of the arms 540a of bellcrank 540 is connected by a spring 542 to a pin 544 on disc 63a, spring 542 resiliently urging bellcrank 540 and thus pin 538, in a counterclockwise direction as viewed in Figure 28. Forwardly of the driven portion 63 of clutch 60 a pawl 546 (Figure 31) is mounted on and connected to shaft 538. Pawl 546 is resiliently urged by spring 542 (Figure 28) toward engagement with a ratchet wheel 61b (Figures 3, 4 and 31) which forms a part of the driving portion 61 of clutch 60.

When the machine is in "rest" position (Figure 28) a roller 548 (Figures 3 and 28) mounted on the upper end of lever 484 engages arm 540b of bellcrank 540 and holds pawl 546 (Figure 31) out of engagement with ratchet wheel 61b. When lever 484 turns in a clockwise direction as viewed in Figure 28, after the machine has been tripped, roller 548 on the upper end of lever 484 moves to the right freeing the pawl mechanism 486. This permits spring 542 to act through bellcrank 540 and pin 538 (Figure 33) and move pawl 546 (Figure 31) into engagement with ratchet wheel 61b. When pawl 546 engages ratchet wheel 61b, a driving connection is established between the driving and driven portions of clutch 60 and the printing drum shaft 42 is driven.

To maintain the switch 64 (Figure 28) in a closed position throughout a complete revolution of the clutch, a lever, generally indicated at 550, is provided. This lever is pivotally mounted on a post 552 (Figure 30) by a screw 554, post 552 being mounted on and extending rearwardly from rear plate 84. Lever 550 lies in the same plane as disc 63a and includes a nose portion 550a which, when the machine is in "rest" position, is positioned in a notch 556 in the edge of disc 63a of the driven portion 63 of clutch 60. When the driven portion 63 of the clutch is turned (Figure 33), the periphery of disc 63a acts upon the nose portion 550a of lever 550 and turns lever 550 in a counterclockwise direction. The lower arm 550b of lever 550 has an adjustable screw 558 thereon which engages a tongue 488c on lever 488 during a cyclical operation. This holds lever 488 in a switch-closing position throughout a complete revolution of the printing drum as lever 550 cannot turn in a clockwise direction to permit lever 488 to move to a switch-opening position until its nose portion 550a again enters notch 556.

Referring to Figure 25, it will be noted that printing drum 40 must turn approximately one-sixth of a revolution before printing begins. Thus, if a letter passed through the machine as soon as it started the machine by engaging tripping lever 58, the impression would never be in the correct position upon the letter. Therefore, tripping lever 58 has mechanism associated therewith which permits it to be turned to tripped position but holds the leading edge of the letter at the correct position in the machine until printing begins. To accomplish this, cam 474 (Figures 28 and 29) has a pin 560 thereon which extends forwardly from cam 474. After the machine has been tripped, pin 560 engages a notch 562a (Figure 32) formed in one of the arms 562c of a bellcrank 562 resiliently urged in a clockwise direction by a spring 568. Because of the engagement of pin 560 with notch 562a, the portion 58a of tripping lever 58 (Figure 26) which is connected to cam 474 by rod 440 (Figure 29), is stopped in a position so that it holds the leading edge of each letter properly positioned over the platen 52 (Figure 25) until the printing drum reaches printing position.

When the printing drum reaches printing position, a cam 63b (Figures 3, 4 and 28) which is formed on the driven portion 63 of clutch 60 and lies in the same plane as link 478 acts upon the upper end of link 478 to move it in a clockwise direction, as shown in Figure 34. Link 478 engages a screw 564 (Figures 32 and 34) on arm 562b of bellcrank 562 and turns bellcrank 562 in a clockwise direction. This moves arm 562c (Figure 32) upwardly freeing pin 560 and thus permits the tripping lever 58 to move to the position it occupies in Figure 26. Lever 58 is held in this position by the letter 566 being printed upon until the rear end of the letter passes between the rollers 54 and 420.

After a letter has passed from the machine, the tripping lever is released so that it returns to the position it occupies in Figure 25 and pin 560 (Figure 32) on cam 474 is moved so that it acts upon a cam surface 570 on arm 562c of bellcrank 562, to move the bellcrank upwardly so that the pin 560 is again positioned so that it will engage notch 562a the next time the machine is tripped.

Resetting of control lever 484 (Figure 28) is effected by moving link 478 to the right out of engagement with latch 480 and then turning lever 484 in a counterclockwise direction until latch 480 drops into notch 484a. As described hereinabove, when the machine is tripped, link 478 is moved upwardly and moves latch 480 upwardly with it where it is held by shoulder 478a. After approximately one-quarter of a revolution, cam 63b (Figure 34), which is in the same plane as link 478 (Figure 4) acts upon link 478 to move it to the right as shown in Figure 34. This moves shoulder 478a from beneath latch 480 so that it drops downwardly on top of roller 512 on lever 484. When the machine has turned one-half of a revolution, a pin 572 (Figure 35) on disc 63a acts upon roller 548 on the upper end of lever 484 to turn lever 484 in a counterclockwise direction. This moves notch 484a beneath latch 480 so that latch 480 can drop into latching position. At this time lever 484 is conditioned for another operation and it cannot again be tripped by tripping link 478 until cam 474 is returned to its "rest" position which occurs when the letter being printed upon passes from the machine.

After lever 484 (Figure 35) has been reset, disc 63a of the driven portion of clutch 60 continues to turn until arm 540b (Figure 28) of bellcrank 540 engages roller 548. This causes bellcrank 540 to be pivoted in a clockwise direction from the position it occupies in Figure 34 to a position in which pawl 546 is disengaged from ratchet wheel 61b. To limit the amount of clockwise movement of bellcrank 540 a pin 574 is provided on disc 63a. As soon as arm 540b engages pin 574 (Figure 28), disc 63b and thus the printing drum are stopped. At this time the nose 550a of lever 550 drops into notch 556 in disc 63b permitting spring 559 to turn lever 550 in a clockwise direction thus releasing pressure on the upper end of lever 488.

Referring to Figure 25, it is necesssary that feed rollers 54 and 420 be driven until the letter being printed upon is fed from the machine. Some envelopes are of considerable length and thus printing drum 40 may complete its revolution before the end of a long envelope passes from beneath the printing drum. Thus, in the case of a long envelope if the feed rollers stopped when the drum completed its revolution the envelope would not be fed from the machine. To insure that feed rollers 54 and 420 are driven until each letter regardless of its length is fed from the machine, a cam 580 (Figures 29 and 31) is mounted on and connected to shaft 440 forwardly of plate 468 (Figure 29). This cam when turned in a clockwise direction by tripping lever 58 (Figure 25) acts upon the right-hand end 582a (Figure 31) of a lever 582 to turn lever 582 in a counterclockwise direction. Lever 582 is pivotally mounted on rear plate 84 by a screw 586 (Figure 29) threading into a post 584.

When tripping lever 58 (Figure 25) moves from the position it occupies in Figure 25 to the position it occupies in Figure 26, cam 580 turns approximately ninety degrees and portion 582b of lever 582 acts upon a tongue portion 488b (Figures 28 and 31) of switch lever 488 to hold lever 488 in a switch closing position. As the upper end of tripping lever 58 (Figure 26) is positioned adjacent feed rollers 54 and 420 when it is in a tripped position, and as a letter such as letter 566 (Figure 26) will hold tripping lever 58 in the position it occupies in Figure 26 as long as the letter is positioned above tripping lever 58, cam 580 (Figure 31) acting through lever 582, insures that motor 62 (Figure 29) will continue to operate and drive the feed rollers until the envelope being printed upon is fed from the machine. Thus, regardless of the length of an envelope it will always be fed from the machine.

To register the sums printed by the machine, register driving gears 588, 590 and 592 (Figure 3) are mounted on and connected to the rear ends of setting shaft 136, 142 and 150 immediately forward of supporting plate 86. Gears 588, 590, and 592 engage and drive three gears 594, 596, and 598 (Figure 4) rotatably mounted on the bearing portion 86a of plate 86. Gears 594, 596, and 598 (Figures 4 and 19) engage and drive three gears 600, 602, and 604 connected to the forward ends of three shafts 606, 608, and 610 extending longitudinally of the machine (Figure 4) and mounted on supporting plate 86 and rear plate 84. Shafts 606, 608, and 610 have 4-toothed setting gears 612, 614, and 616 (Figures 4 and 23) which are aligned with the setting gears of four registering assemblies, generally indicated at 618, 620, and 622.

The registering assemblies are of a well known type and each consists of a setting gear having a cam slot associated with it. The cam slot acts upon pins on a series of nine radially slidable teeth mounted on a member which is stationary when the machine is in "rest" position. The cam slot as it is turned by its setting gear acts upon the pins to move the teeth outwardly into registering position, the number of teeth moved into registering position being the same as the units in the digit set up by the setting knob associated with the registering assembly being set. These pins, such as pin 624 (Figures 4 and 23) act when the shaft 42 makes a revolution upon a gear similar to gear 626 to turn counterwheel gears 628 which actuate the counterwheels 650 to register the amount set up on its related setting knob. Each of the counterwheels is preferably provided with a detent such as detent 630 which limits the rotation of a counterwheel to the amount being fed into it. Suitable carry-over mechanism is provided between the counterwheels of both registers to insure the carry-over of tens as they are accumulated by any given counterwheel.

To insure the proper alignment of gears 612, 614 and 616 (Figure 23) and thus the alignment of the setting gears on the registering assemblies, shafts 606, 608 and 610 have four-toothed gears 632, 634 and 636 mounted on their rear ends (Figure 22) immediately forward of rear plate 84 (Figure 4). An arm 638 (Figure 20) is pivotally mounted on rear plate 84 by a screw 640 and has a roller 642 thereon which rides on the periphery of a cam 644 connected to printing drum shaft 42. When the machine is in "rest" position, roller 642 is positioned in a recess 646 in the periphery of cam 644, and as soon as shaft 42 turns, cam 644 (Figure 22) acts upon roller 642 to move arm 638 in a clockwise direction against four-toothed gears 632, 634 and 636. This aligns gears 632, 634 and 636 and thus all mechanism on shafts 606, 608 and 610. Arm 638 is resiliently urged in a counterclockwise direction at all times by a spring 648 which is connected to a pin 649 on plate 84 (Figure 20) and to the upper end of arm 638.

The register 80 (Figure 3) of which counterwheels 650 form a part is the descending register and thus, when this register reaches zero position, the machine must be locked to prevent its further operation. To accomplish this each of the three highest order counterwheels is provided with notches similar to notch 650a (Figures 20, 21, and 22), and a lever 652 provided with a comb 654 is provided for locking the mechanism of the machine when the three notches in the highest order counterwheels are aligned with comb 654. Lever 652 is resiliently urged at all times in a clockwise direction by a spring 656 connected to the upper end of lever 652 (Figure 20) and to pin 651 on rear plate 84. The lower end of lever 652 is provided with a portion 652a which, when the register is not in zero position, is engaged by the lower end of a bellcrank 658. Bellcrank 658 is pivotally mounted on rear plate 84 on a stud shaft 660 and is resiliently urged in a clockwise direction by a spring 662 connected to bellcrank 658 and to pin 651. The arm 658a of bellcrank 658 is engaged on its outer edge by a lever 664 connected to a shaft 666 rotatably mounted on back plate 84. A spring 668 connected to rear plate 84 by a pin 669 and to an arm 664a of lever 664 resiliently urges lever 664 in a counterclockwise direction.

When comb 654 enters aligned notches in the three highest order counterwheels, as shown in Figure 21, spring 656 turns lever 652 in a clockwise direction. This permits spring 662 to turn bellcrank 658 in a clockwise direction so that the end of arm 658a is positioned in a recess 652b formed in lever 652. When arm 658a moves in a clockwise direction from the position shown in Figure 20, to the position shown in Figure 21, lever 664 and thus shaft 666 is moved in a counterclockwise direction by spring 668.

An arm 670 (Figure 28) secured to shaft 666 rearwardly of plate 84 is moved to the right, as shown in Figure 28, when shaft 666 turns and as it moves to the right, link 672, which is pivotally connected to arm 670, moves to the right with it. Link 672 is pivotally connected to arm 670 by pivot pin 674 and its right-hand end is supported by a screw 676 which extends through a slot 672a in link 672 and is connected to rear plate 84. A tongue 672b (Figures 3 and 28) extending rearwardly from link 672 engages the upper end of tripping link 478 and moves it to the right, as viewed in Figure 28 when the register reaches zero. This moves shoulder 478a on link 478 to the right of latch 480. Thus, when the zero lock is effective and the tripping lever 58 is tripped, link 478 is raised but latch 480 is not moved upwardly. Thus, whenever comb 654 (Figure 20) enters aligned notches in the counterwheels, further operation of the machine is prevented.

To prevent the zero lock from becoming effective during an operating cycle, lever 652 (Figure 21) includes nose portion 652c which is engaged by roller 642 on arm 638 when roller 642 is riding on the periphery of cam 644. Thus, during a cyclical operation roller 642 prevents lever 652 from moving in a clockwise direction and thus, the zero block cannot become effected (Figure 22) during a cyclical operation. Roller 642 contacts and moves lever 652 in a counterclockwise direction, so that the comb 654 clears the periphery of wheels 650 during a cycle of the machine. This prevents any friction between the wheels 650 and the comb 654 while the wheels 650 are rotating. When roller 642 enters the recess 646 in the periphery of cam 644 as shown in Figure 21 at the end a cycle, lever 652 can then pivot in a clockwise direction and the zero lock becomes effective if all of the notches in the highest order counterwheels are aligned with comb 654. Referring to Figure 21, it will be noted that when the zero lock is effective, bellcrank 658 prevents movement of lever 652 in a counterclockwise direction as portion 652c of lever 652 engages roller 642 and holds it in recess 646. This prevents the head shaft 42 from being turned while lever 652 is in locked position.

To reset the register, cover plate 680 is moved upwardly, as viewed in Figure 3, to align an opening 680a therein with the counterwheels 650. Cover plate 680 is mounted on the top of the machine by screws 682 which extend through slots therein. Cover plate 680 is moved transversely of the machine by a member 684 pivotally mounted on the machine. Member 684 has a pin 686 thereon, which coacts with slot 680b so that as member 684 is turned, cover 680 is moved transversely of the machine. When cover 680 is moved to the left, as viewed in Figure 21, a tongue 680c engages the upper portion 658b of bellcrank 658, moving it to the left. This causes arm 658a of bellcrank 658 to act upon lever 654 and thus move the link 672 (Figure 28) to a position where it will permit link 478 to again engage latch 480 if it is raised by the cam 474 actuated by tripping lever 58. Cover plate 680 has a pin 691 (Figure 20) which engages comb 654 and moves it out of engagement with the counterwheels when the cover 680 is moved to the left. This permits the counterwheels to be reset by a stylus. Cover plate 680 is next moved back to its normal position with window 693 aligned with the top digits on the register counterwheels (Figure 3) and the machine is again ready for operation.

In operation, when a letter is fed into chute 92a (Figure 1), it strikes trip 58 (Figure 25) and moves it to the right turning trip shaft 440 (Figure 29). This turns cam 474 mounted on the rear end of rod 440 having pin 560 (Figure 32) thereon in a counterclockwise direction. Pin 560, after trip 58 (Figure 25) has moved approximately 30 degrees, engages hook 570 (Figure 32) and this stops trip 58 causing it to hold the leading edge of the letter above platen 52.

When cam 474 (Figure 28) is turned by trip 58, it moves link 478 upwardly and link 478 in turn moves latch 480 upwardly. This permits spring 482 to turn control lever 484 in a clockwise direction causing it to strike tongue 488a on lever 488 and turn lever 488 in a clockwise direction. Another tongue 488b on lever 488 engages switch lever 522 of switch 64 completing the circuit to motor 62 (Figure 29).

At the same time that lever 484 (Figure 28) acts to close switch 64, a roller 548 on its upper end moves off the upper arm 540b of bellcrank 540. This permits spring 542 to turn bellcrank 540 and thus shaft 538 on which pawl 546 (Figure 31) is mounted causing pawl 546 to engage a ratchet wheel 615b which forms a portion of the driving portion 61 of clutch 60.

When the circuit is completed to motor 62 (Figure 29), it drives shaft 378 through worm gears 374 and 376. Shaft 378 has a gear 530 (Figure 28) mounted on its rear end which acts through idler gear 532 to drive the driving portion 61 (Figure 4) of clutch 60, portion 61 of clutch 60 being rotatably mounted on printing drum shaft 42, and the driven portion 63 of clutch 60 being connected to shaft 42. When pawl 546 (Figure 1) connects the driving and driven portions of the clutch, the driving portion 61 of clutch 60 drives the driven portion 63 and thus the printing drum shaft 42, causing the printing drum 40 to turn.

When the printing drum shaft 42 turns, it turns a cam 63b which forms part of the driven portion 63 of clutch 60. This cam moves link 478 to the right, as viewed in Figure 28, and link 478 acts through an adjustable screw 564 to turn bellcrank 562 in a clockwise direction. When bellcrank 562 (Figure 32) turns, it frees pin 560 and permits the tripping lever to move to the position it occupies in Figure 26. This releases the letter when the printing drum 40 (Figure 25) reaches printing position and thus insures that each stamp is properly positioned upon each letter.

When disc 63 of clutch 60 turns during each cyclical operation of the machine, the edge of disc 63 acts upon lever 550 (Figures 28 and 34) to move it in a counterclockwise direction causing adjustable screw 558 to engage a tongue 488c on lever 488. Lever 550 acting through screw 558 maintains its pressure upon lever 488 throughout a complete revolution of disc 63a and thus insures that switch 64 will be held closed throughout a complete revolution of the printing arm 40.

When long envelopes are being stamped, the printing drum 40 (Figure 26) may complete its revolution before the envelope passes from the machine. Cam 580 (Figure 31) insures that feed rollers 54 and 420 (Figures 25) will be driven until each envelope passes from the machine. This cam is mounted on trip shaft 440 and when a letter passes through the machine (Figure 26), it acts through trip 58 to move to the position it occupies in Figure 34. When cam 580 is in this position, it turns lever 582 (Figure 3) in a counterclockwise direction so that its left-hand end 582b acts upon tongue 488b (Figure 34) of lever 488 to maintain lever 488 in switch closing position. As each letter holds trip 58 depressed until its end passes between the feed rollers, cam 580 and lever 582 ensure that the circuit to motor 62 (Figure 29) is maintained until each letter is fed from the machine regardless of its length.

Referring to Figures 7, 14 and 15, the printing drum 40 as described hereinabove includes a section 46 connected to printing drum shaft 42 and a detachable section 44 detachably mounted on shaft 42. Type wheels 66, 68, and 70 which are mounted on section 46 of the printing drum are set by knobs 72, 74 and 76 (Figure 1), which are operatively connected to shafts 158, 142 and 136

(Figure 3). Shafts 158, 142 and 136 act through gears 184, 132 and 130 mounted thereon to move racks 190, 188 and 186 transversely of the machine. Racks 190, 188 and 186 drive pinions similar to pinion 116 (Figure 16) on section 46 of the drum. These pinions mesh with a series of idler gears 110, 112 and 114 (Figure 15) which in turn mesh with and drive gears connected to type wheels 66, 68 and 70. Thus, when setting knobs 72, 74 and 76 (Figure 1) are turned, the type wheels on section 46 of the printing drum are set.

As described hereinabove, a pair of discs 109 and 197 (Figure 4) having annular teeth 109b and 197a thereon are provided to lock the setting knobs and type wheels in their set positions during each operating cycle. When the printing drum turns, the tooth 109b turns with it and passes between aligned teeth on racks 190, 188 and 186. This locks the racks and thus the setting knobs so that they cannot turn until the machine again reaches "rest" position. Annular tooth 197a (Figures 4 and 8) is stationary and the pinions, similar to pinion 116 (Figure 16) turn with the printing drum. Thus, as the printing drum turns, tooth 197a passes between aligned teeth on the three pinions of the printing drum and locks them against movement. This locks the type wheels in set positions during each cycle of operation.

As described hereinabove, the machine is provided with three manually settable dies on the printing drum. These dies are the P. L. & R. die 342 (Figure 15), a date wheel die 340, and a date circle die 338. Whether or not all or any of these dies print during an operating cycle depends upon the position of cams 208, 210 and 212 (Figure 4a) which are set by knob 204. The relative position of the cams with respect to the dies associated with them determines whether or not any given die will print, as each die is provided with a spring to hold it in non-printing position unless its cam moves it to printing position. Thus, if the operator desires to print any individual die or combination of them he turns knob 204 to set cams 208, 210, and 212 so that all or any combination of their respective dies are moved into printing position when the dies reach printing position.

When the removable section 44 of the printing drum is mounted on the machine, sleeve 206 is slid onto shaft 42 to position section 44 of the drum in the position indicated by the dotted line 248 (Figure 15a). Next, by turning knob 204 (Figure 4a) the removable section 44 of the printing head is turned in a counterclockwise direction (Figure 15a) through a driving connection established between sleeve 206 and section 44 by a slot 282b connected to sleeve 296 and arm 280 connected to section 44. When the removable section of the printing drum reaches the position it occupies in full lines in Figure 15a, arm 280 is aligned with a slot 292 (Figure 4a) in flange 216c so that arm 280 and sleeve 206 may be moved rearwardly in the machine. When sleeve 206 is moved rearwardly, the connection between slot 282b and arm 280 is broken and section 44 of the drum is free to turn on sleeve 206. At this time pins 250 and 252 on section 44 (Figure 7) enter holes 254 and 256 in disc 109 (Figure 4a), connecting section 44 of the drum to shaft 42. When the detachable section 44 of the drum reaches this position, catch 258 snaps into position behind the head 42a of shaft 42 and this holds sleeve 206 and thus the removable section 44 of the printing drum in operating position upon the machine.

When the detachable section of the printing drum is to be removed from the machine, knob 266 is pressed inwardly which disengages catch 258 from the head of shaft 42. At this time the removable section 44 of the printing drum may be moved outwardly to establish connections between arm 280 and slot 282b and between slot 294 and flange 216c. Section 44 is then turned to the dotted line position 248 in Figure 15a and at this time the removable section 44 of the printing drum may be removed from shaft 42.

The detachable section 44 of the drum and sleeve 206 are mounted on mechanism 50 (Figures 2a, 5, 6, and 7) which is mounted on the front of the machine on locating pins 222 and 224. When section 44 is mounted on shaft 42, a cam 322 (Figure 9), connected to sleeve 206 (Figure 4a) is moved to permit locking plates 298 and 300 to lock mechanism 50 to locating pins 222 and 224 (Figure 2) on the upper front plate of the machine. When the section 44 is being removed from the machine, as sleeve 206 is turned, cam 322 acts to move locking plates 298 and 300 to positions (Figure 10) where they do not lock mechanism 50 to locating pins 222 and 224. Thus, section 44 of the printing drum is readily removable so that the date wheel dies and a slogan die, if one is used, which are both on the removable section 44 of the drum, may be quickly and easily set.

Each time a sum is printed by printing drum 40 (Figure 3) the sum is registered on the ascending and descending registers 78 and 80. To accomplish this when shafts 136, 142 and 158 are turned to set the type wheels on the printing drum gears 588, 590 and 592 connected to the ends of these shafts turn gears 594, 596 and 598 (Figure 4). These gears mesh with and turn gears connected to shafts 606, 608, and 610 (Figure 23). As these gears are turned they turn setting gears 612, 614, and 616, each of which meshes with the setting gear of a registering assembly. As the setting gear of each registering assembly is turned the registering assembly is conditioned to register the digits set upon it during the next cyclical operation. The digits are fed into the registers through idler gears similar to idler gear 626.

To align setting gears 612, 614 and 616 an arm 638 is provided (Figure 22). This arm has a roller 642 thereon which rides on the periphery of a disc 644 connected to drum shaft 42. When the machine is in "rest" position roller 642 is positioned in a recess 646 in disc 644 (Figure 20) and when the machine begins to turn disc 644 acts through roller 642 to move arm 638 outwardly (Figure 22) to engage three gears 632, 634 and 636 which are similar to gears 612, 614 and 616 (Figure 23). When arm 638 engages gears 632, 634 and 636 it aligns these gears and thus acts through shafts 606, 608 and 610 to align gears 612, 614 and 616.

The machine is provided with zero lock mechanism which includes a comb 654 which when aligned with a series of notches in the counterwheels similar to notch 658 (Figure 20) permits lever 652 to be moved in a clockwise direction by a spring 656. As described hereinabove this frees lever 658 which permits bellcrank 664 to be turned by spring 668 in a counterclockwise direction. Bellcrank 664 is connected to shaft 666 and when it turns in a counterclockwise direction it turns arm 670 (Figure 28) in a clockwise direction. As arm 670 is connected to link 672 having a tongue 672b thereon tongue 672b is moved to the right as viewed in Figure 28, a sufficient distance so that shoulder 478a is moved to the right of latch 480. Thus when the machine is tripped latch 480 is not raised and accordingly when the zero lock is in effect the machine cannot be operated.

Thus it will be seen that a practical and efficient machine has been described which is light in weight, of simple construction, and may be easily operated by the user.

Accordingly, it will be seen that the several objects hereinabove mentioned as well as many others are successfully accomplished by this machine.

What is claimed is:

1. In a machine of the type described, in combination, means for printing upon each letter passing through said machine, means for actuating said printing means, trip means engaged by each letter passing through said machine for controlling the operation of said last mentioned means, a pair of feed rollers for ejecting letters from said machine, said trip means being in the form of a lever the upper end of which when in tripped position is positioned beyond said printing means and adjacent said feed rollers and held there by each letter passing through the machine, means for driving said feed rollers, said trip means controlling the operation of said driving means, said driving means continuing to drive said feed rollers as long as said trip means is in a depressed position whereby each letter regardless of its length is fed from said machine.

2. In a machine of the type described, in combination, a framework, a shaft mounted on said framework, a printing drum mounted on said shaft, clutch means including driving and driven portions, said driven portion of said clutch being connected to said shaft, means for driving the driven portion of said clutch, switch means controlling the operation of said clutch driving means, trip means actuated by each letter passing through said machine, a control lever, said control lever being mounted for co-action with said switch means and having means associated therewith for urging it in switch closing position, latch means restraining said control lever from movement to switch closing position, and means operatively connecting said trip means and said latch means, said trip means when actuated by a letter acting through said last mentioned means and said latch means to permit said control lever to move to switch closing position and thus cause the driven portion of said clutch to be driven.

3. In a machine of the type described, in combination, a framework, a shaft mounted on said framework, a printing drum mounted on said shaft, clutch means including driving and driven portions, the driven portion of said clutch being connected to said shaft, means for cyclically driving the driven portion of said clutch, switch means controlling the operation of said clutch driving means, trip means actuated by each letter passing through said machine, a control lever, said control lever being mounted for co-action with said switch means, a trip link, latch means for holding said control lever in an inoperative position, said trip link controlling movement of said latch means, means operatively connecting said trip means with said tripping link, said tripping link when actuated by said trip means moving said latch means to release said control lever and permit said control lever to move to switch-closing position.

4. In a machine of the type described, in combination, a framework, a shaft mounted on said framework, a printing drum mounted on said shaft, clutch means including driving and driven portions, the driven portion of said clutch being connected to said shaft, means for cyclically driving the driven portion of said clutch, switch means controlling the operation of said clutch driving means, trip means actuated by each letter passing through said machine, a control lever, said control lever being mounted for co-action with said switch means, pawl means for connecting the driving and driven portions of said clutch, said pawl means being held in a disengaged position by said control lever when said machine is in "rest" position, and means operatively connecting said trip means and said control lever, said trip means when actuated by a letter actuating said last mentioned means to permit said control lever to move to switch-closing position, control lever when in switch-closing position permitting said pawl mechanism to move to an engaged position.

5. In a machine of the type described, in combination, a framework, a shaft mounted on said framework, a printing drum mounted on said shaft, clutch means including driving and driven portions, the driven portion of said clutch being connected to said shaft, means for cyclically driving the driven portion of said clutch, switch means controlling the operation of said clutch driving means, trip means actuated by each letter passing through said machine, a control lever, said control lever being mounted for co-action with said switch means, means operatively connecting said trip means and said control lever, said means holding said control lever in inoperative position when said drum is in "rest" position, said trip means when actuated by a letter actuating said last mentioned means to permit said control lever to move to switch closing position, and cam means mounted on said shaft, said cam means engaging and moving said control lever into an inoperative position after it has been tripped during each cycle of operation.

6. In a machine of the type described, in combination, a framework, a shaft mounted on said framework, a printing drum mounted on said shaft, clutch means including driving and driven portions, said driven portion of said clutch being connected to said shaft, means for driving the driven portion of said clutch, switch means controlling the operation of said clutch driving means, trip means actuated by each letter passing through said machine, a control lever, said control lever being mounted for co-action with said switch means, latch means controlling movement of said control lever, and means operatively connecting said trip means and said latch means, said trip means when actuated by a letter acting through said last mentioned means and said latch means to permit said control lever to move to switch closing position and thus cause the driven portion of said clutch to be driven, pawl means connecting the driving and driven portions of said clutch, and means connecting said pawl means and said control lever whereby when said control lever moves to switch closing position, pawl means is released to permit it to be moved to an engaged position.

7. In a machine of the type described, in combination, a framework, a shaft mounted on said framework, a printing drum mounted on said shaft, clutch means including driving and driven portions, said driven portion of said clutch being connected to said shaft, means for driving the driven portion of said clutch, switch means controlling the operation of said clutch driving means, trip means actuated by each letter passing through said machine, a control lever, said control lever being mounted for co-action with said switch means, latch means controlling movement of said control lever, and means operatively connecting said trip means and said latch means, said trip means when actuated by a letter acting through said last mentioned means and said latch means to permit said control lever to move to switch closing position and thus cause the driven portion of said clutch to be driven, pawl means connecting the driving and driven portions of said clutch, and means connecting said pawl means and said control lever whereby when said control lever moves to switch closing position, pawl means is released to permit it to be moved to an engaged position, and means actuated by the driven portion of the clutch for holding said switch means in a closed position throughout each cycle of operation.

8. In a machine of the type described, in combination, a framework, a shaft mounted on said framework, a printing drum mounted on said shaft, clutch means including driving and driven portions, the driven portion of said clutch being connected to said shaft, means for cyclically driving the driven portion of said clutch, switch means controlling the operation of said clutch driving means, trip means actuated by each letter passing through said machine, a control lever, a trip link, latch means for holding said control lever in an inoperative position, said trip link controlling movement of said latch means, means operatively connecting said trip means with said tripping link, said tripping link when actuated by said trip means moving said latch means to release said control lever and permit said control lever to move to switch closing position, a register for registering sums printed by said printing drum and zero lock means connected with said register, said zero lock being actuated when said register reaches zero position, link means actuated by said zero lock when said zero lock moves to a locked position for moving said tripping link to a position where it cannot engage said latch means when said trip means is actuated.

9. In a machine of the type described, in combination, a mail chute in said machine through which each letter being printed upon passes, means for printing upon each letter as each letter passes through said mail chute, means for actuating said printing means, trip means positioned in said mail chute controlling the actuation of said printing means, trip control means including a hook portion, said hook portion normally engaging and preventing said trip means from being moved to a tripped position, said trip control means being moved to a trip means releasing position by a letter properly positioned in the machine as it passes through said mail chute, at which time said hook portion is moved out of the path of said trip means, said trip control means being positioned adjacent the rear of said mail chute, thus requiring each letter to be properly positioned in said chute in order to have it actuate said trip control means.

10. In a machine of the type described, in combination, a framework, a shaft mounted on said framework, a printing drum mounted on said shaft, clutch means including driving and driven portions for cyclically driving said shaft thru one revolution, the driven portion of said clutch being connected to said shaft, means for cyclically driving the driven portion of said clutch, switch means controlling the operation of said clutch driving means, a tripping link, means for actuating said switch means, the operation of said last mentioned means being controlled by said tripping link, trip means actuated by each letter passing through the machine, means actuated by said trip means when it is moved to a tripped position to move said tripping link to a tripped position to cause said switch-closing means to close said switch, lever means associated with said clutch and said switch means for holding said switch means closed during an operative cycle, said lever means becoming operative at the beginning of an operative cycle, and means for moving said tripping link to an inoperative position following the movement of said lever means to a switch-closing position.

11. In a machine of the type described, in combination, a mail chute through which each letter being printed upon passes, means for printing upon each letter passing through said chute, means for actuating said printing means, trip means controlling the actuation of said printing means including an element normally positioned in said chute and adapted to be engaged by the leading edge of a letter and moved thereby for actuating said printing means, said trip means including a releasable locking means for normally restraining said element in effective position in said chute preventing movement of a letter therethrough, trip control means located in said chute adjacent the rear edge portions thereof and arranged to be engaged by each letter properly positioned in said chute, and connections from said trip control means for releasing said element locking means upon being so engaged by a letter.

12. In a machine of the type described, in combination, a mail chute, means for printing upon each letter passing through said chute, means for actuating said printing means, movable trip means engaged by each letter passing through said machine for controlling the operation of said printing means, a pair of feed rollers beyond said printing means for ejecting letters from said machine, means for driving said feed rollers, said trip means being mounted and arranged normally in said chute for an initial partial forward movement by the corresponding letter for initiation of the printing operation, and said trip means being adapted for further forward motion to an advanced position where it is held by continued advance of the letter, and connections from said trip means to said feed roller driving means for maintaining the latter effective while said trip means is held in said advanced position by the letter.

13. In a machine of the type described, in combination, a mail chute through which each letter being printed upon passes, means for printing upon each letter passing through said mail chute, means for actuating said printing means, trip means positioned in said mail chute controlling the actuation of said printing means by movement toward or from an actuation position, said trip means being in the form of a lever contacted to move to said actuation position by the leading edge of each letter passing through the machine, and trip control means connected and arranged to releasably lock said trip means including a movable member normally engaging and locking said trip means against movement toward said actuation position, and another member connected to said first-mentioned member and extending upwardly into said chute adjacent the rear edge thereof to move said first-mentioned member when depressed by a letter to release said trip means for movement by said letter to said actuation position.

14. In a machine of the type described, in combination, means forming a path for directing letters through the machine, means for printing upon each letter passing through the machine, means for actuating said printing means, trip means controlling the actuation of said printing means by movement toward or from an actuation position, said trip means being in the form of a lever contacted to move to said actuation position by the leading edge of each letter passing through the machine, and trip control means connected and arranged to releasably lock said trip control means including a movable member normally engaging and locking said trip means against movement toward said actuation position, and another member extending into said path to be engaged by the leading end of the letters and connected to move said first-mentioned member when depressed by a letter to release said trip means for movement by said letter to said actuation position.

HARRY L. LAMBERT.

References Cited in the file of this patent

UNITED STATES PATENTS

| Number | Name | Date |
| --- | --- | --- |
| Re. 15,734 | Pitney | Dec. 18, 1923 |
| 1,623,478 | Jahn | Apr. 5, 1927 |
| 1,904,626 | Ogden | Apr. 18, 1933 |
| 2,009,490 | Gay | July 30, 1935 |
| 2,044,755 | Pearson | June 16, 1935 |
| 2,179,269 | Ogden | Nov. 7, 1939 |
| 2,189,456 | Komusin | Jan. 16, 1940 |
| 2,204,971 | Rouan | June 18, 1940 |
| 2,234,583 | Thatcher | Mar. 11, 1941 |
| 2,350,703 | Ryan et al. | June 6, 1944 |
| 2,352,802 | Ryan et al. | July 4, 1944 |
| 2,373,503 | Sager et al. | Apr. 10, 1945 |
| 2,377,522 | Ryan | June 5, 1945 |
| 2,380,331 | Ryan | July 10, 1945 |